United States Patent [19]

Yamanashi

[11] Patent Number: 5,805,359
[45] Date of Patent: Sep. 8, 1998

[54] WIDE-ANGLE LENS SYSTEM

[75] Inventor: Takanori Yamanashi, Kokubunji, Japan

[73] Assignee: Olympus Optical Co., Ltd., Tokyo, Japan

[21] Appl. No.: 650,138

[22] Filed: May 17, 1996

[30] Foreign Application Priority Data

May 19, 1995 [JP] Japan .................................... 7-121633
May 19, 1995 [JP] Japan .................................... 7-121634

[51] Int. Cl.$^6$ ........................... G02B 15/14; G02B 13/04; G02B 13/02
[52] U.S. Cl. ........................... 359/753; 359/686; 359/747
[58] Field of Search .................................... 359/684, 686, 359/680, 728, 746, 747, 748, 753, 761, 770, 750, 751, 752, 777, 781–783, 787, 823

[56] References Cited

U.S. PATENT DOCUMENTS

| | | | |
|---|---|---|---|
| 2,721,499 | 10/1955 | Bertele | 359/753 |
| 2,734,423 | 2/1956 | Bertele | 359/753 |
| 2,781,695 | 2/1957 | Klemt | 359/753 |
| 3,634,000 | 1/1972 | Dietzsch et al. | 359/753 |
| 3,700,312 | 10/1972 | Bertele | 359/753 |
| 4,331,391 | 5/1982 | Baker | 359/753 |
| 5,315,441 | 5/1994 | Hori et al. | 359/753 |
| 5,329,401 | 7/1994 | Sato | 359/686 |
| 5,406,416 | 4/1995 | Ohtake | 359/686 |
| 5,483,380 | 1/1996 | Nozawa | 359/686 |
| 5,559,638 | 9/1996 | Aoki et al. | 359/749 |
| 5,592,334 | 1/1997 | Oshikiri et al. | 359/689 |
| 5,621,575 | 4/1997 | Toyama | 359/753 |
| 5,631,780 | 5/1997 | Sato | 359/749 |

*Primary Examiner*—Frank G. Font
*Assistant Examiner*—Michael P. Stafira
*Attorney, Agent, or Firm*—Cushman Darby & Cushman IP Group of Pillsbury Madison & Sutro LLP

[57] ABSTRACT

The invention provides a solution to a problem of allowing a symmetrical wide-angle lens system to have a large aperture ratio, and achieves an optical system which is well improved in terms of sagittal coma and curvature of field, and has a satisfactory vignetting factor as well. The optical system comprises basically a first lens group G1 having a negative refracting power, a second lens group G2 containing an aperture stop and having a positive negative power, and a third lens group having a negative refracting power. The second lens group G2 is divided into front and rear sub-groups $G_{21}$ and $G_{22}$, each having a positive refracting power, between which the aperture stop is located. The first lens group G1 comprises at least one negative meniscus lens convex on an object side; the front sub-group $G_{21}$ of the second lens group comprises at least one set of cemented lens including a positive lens and a negative lens; and the rear sub-group $G_{22}$ of the second group comprises at least one set of cemented lens including a positive lens and a negative lens. A third lens group G3 comprises at least one negative meniscus lens convex on an image side. An aspherical surface is used in any one of the lens groups.

25 Claims, 14 Drawing Sheets

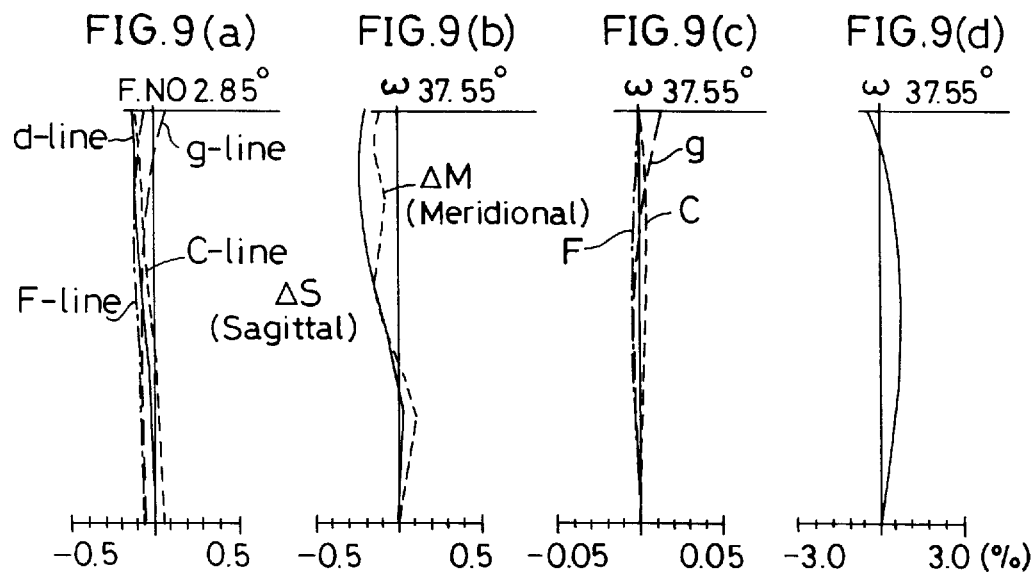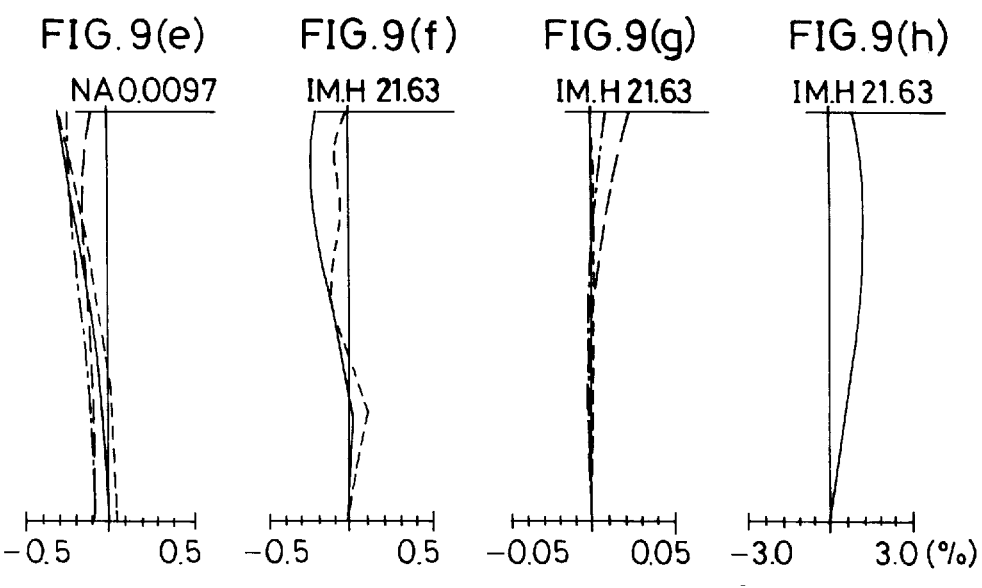

F.NO 2.82

ω 37.66°

ω 37.66°

ω 37.66°

NA 0.0097

IM.H 21.63

IM.H 21.63

IM.H 21.63

FIG.11(a) F.NO 2.88 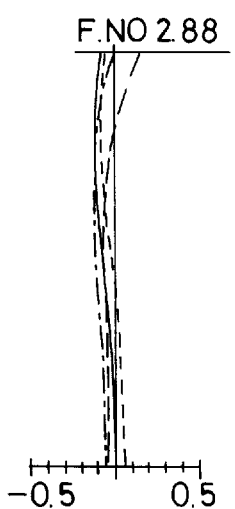
FIG.11(b) ω 37.546° 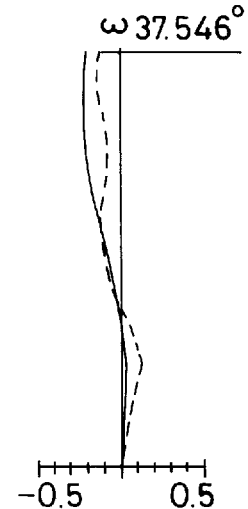
FIG.11(c) ω 37.546° 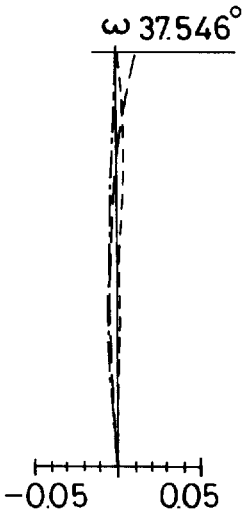
FIG.11(d) ω 37.546° 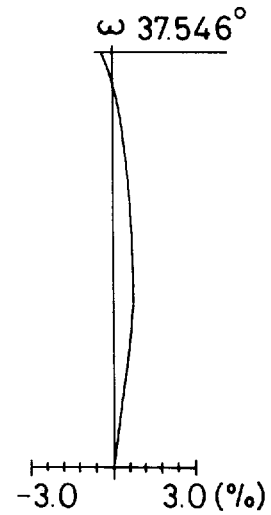
FIG.11(e) NA 0.0096 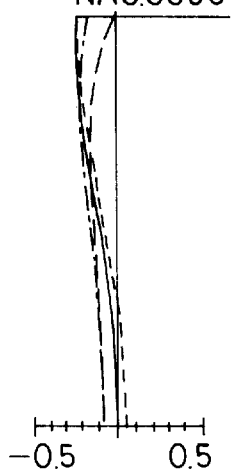
FIG.11(f) IM.H 21.63 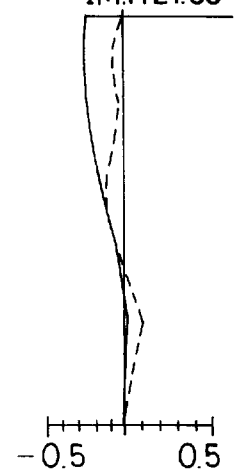
FIG.11(g) IM.H 21.63 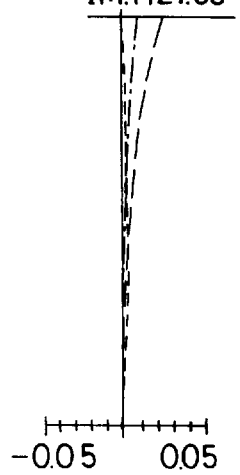
FIG.11(h) IM.H 21.63 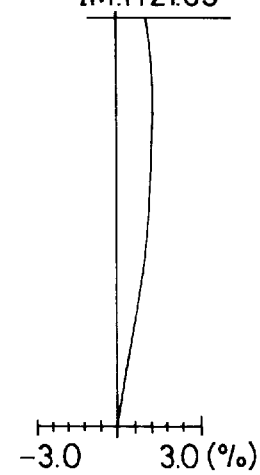

F.NO 2.82

-0.5　0.5

ω 35.277°

-0.5　0.5

ω 35.277°

-0.05　0.05

ω 35.277°

-3.0　3.0 (%)

NA 0.0100

-0.5　0.5

IM.H 20.00

-0.5　0.5

IM.H 20.00

-0.05　0.05

IM.H 20.00

-3.0　3.0 (%)

F.NO 2.82

-0.5  0.5

ω 37.503°

-0.5  0.5

ω 37.503°

-0.05  0.05

ω 37.503°

-3.0  3.0 (%)

NA 0.0099

-0.5  0.5

IM.H 21.63

-0.5  0.5

IM.H 21.63

-0.05  0.05

IM.H 21.63

-3.0  3.0 (%)

F.NO 2.88

ω 37.462°

ω 37.462°

ω 37.462°

NA 0.0094

IM.H 21.63

IM.H 21.63

IM.H 21.63

F.NO 2.85
−0.3   0.3

ω 45.811°
−0.3   0.3

ω 45.811°
−0.02   0.02

ω 45.811°
−1.0   1.0 (%)

NA 0.0072
−0.3   0.3

IM.H 21.63
−0.3   0.3

IM.H 21.63
−0.02   0.02

IM.H 21.63
−1.0   1.0 (%)

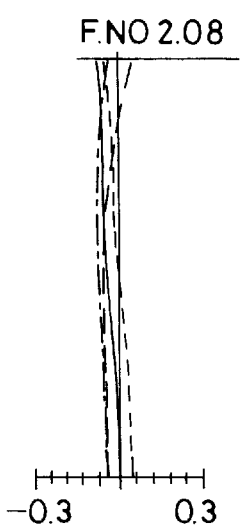
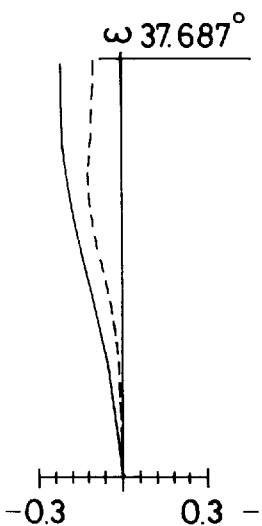
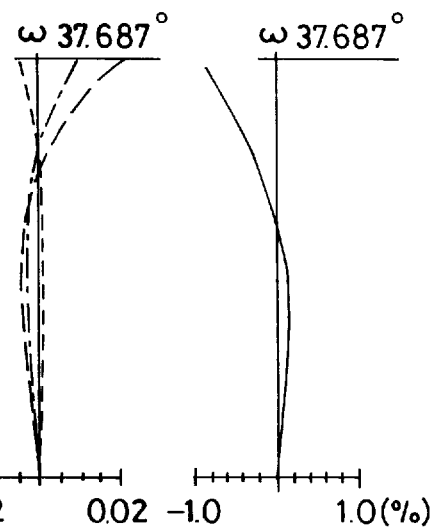
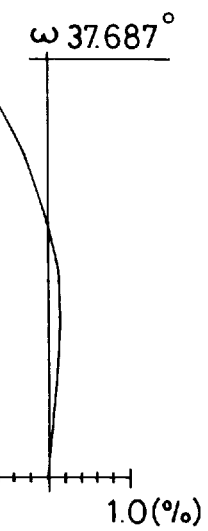
FIG.16(a) F.NO 2.08
FIG.16(b) ω 37.687°
FIG.16(c) ω 37.687°
FIG.16(d) ω 37.687°
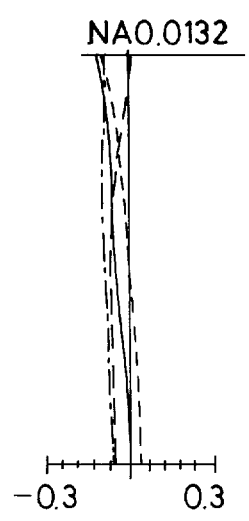
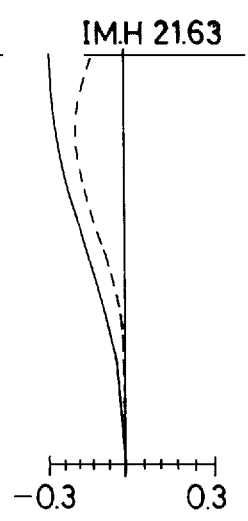
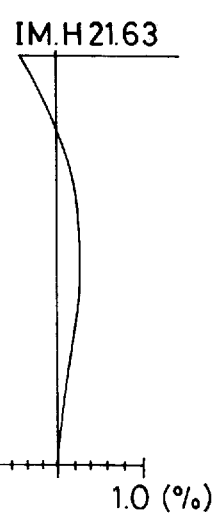
FIG.16(e) NA 0.0132
FIG.16(f) IM.H 21.63
FIG.16(g) IM.H 21.63
FIG.16(h) IM.H 21.63

FIG.17(a) F.NO 2.08
FIG.17(b) ω 37.685°
FIG.17(c) ω 37.685°
FIG.17(d) ω 37.685°
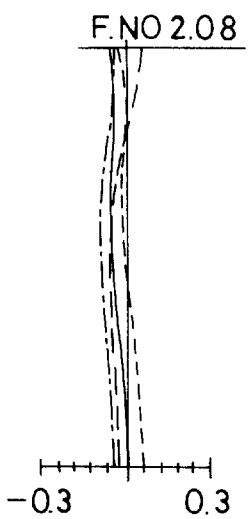
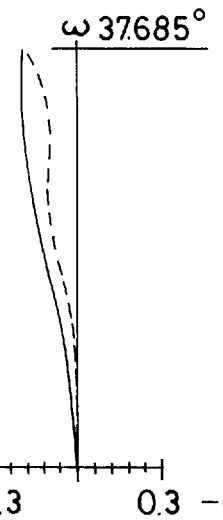
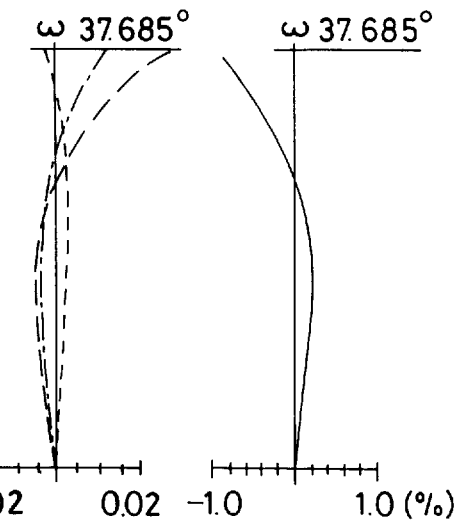
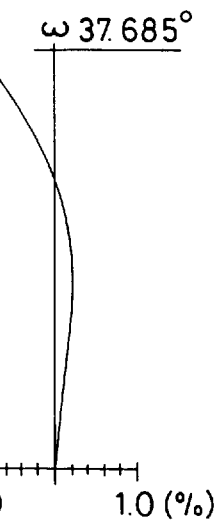
-0.3   0.3   -0.3   0.3   -0.02   0.02   -1.0   1.0 (%)
FIG.17(e) NA 0.0128
FIG.17(f) IM.H 21.63
FIG.17(g) IM.H 21.63
FIG.17(h) IM.H 21.63
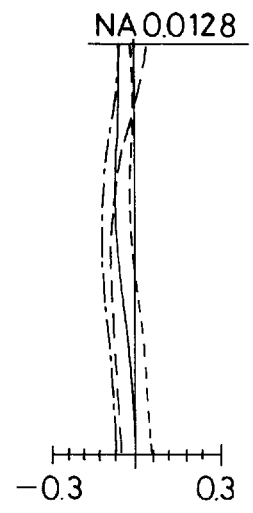
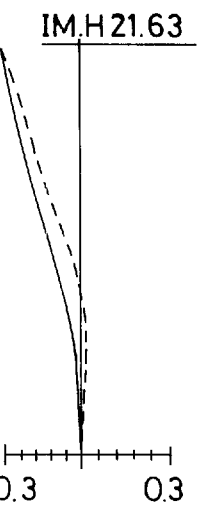
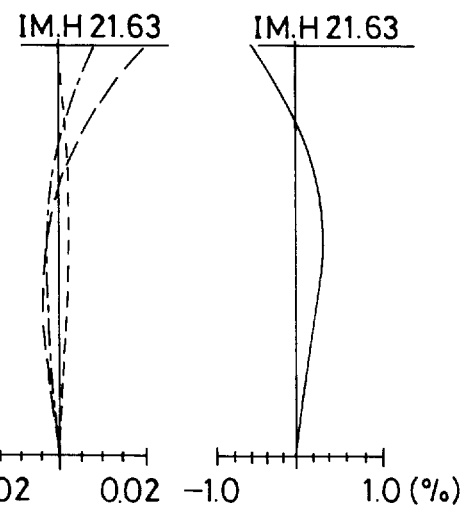
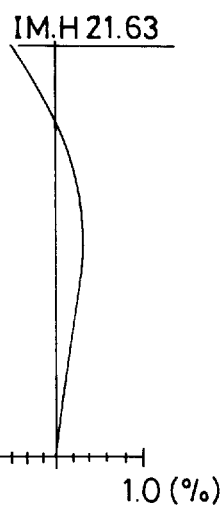
-0.3   0.3   -0.3   0.3   -0.02   0.02   -1.0   1.0 (%)

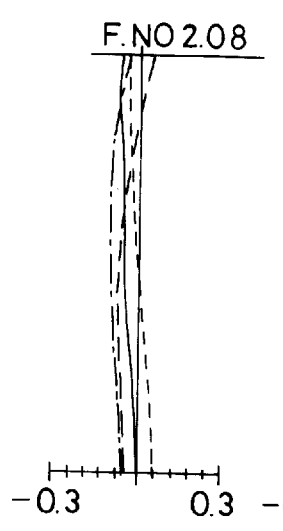 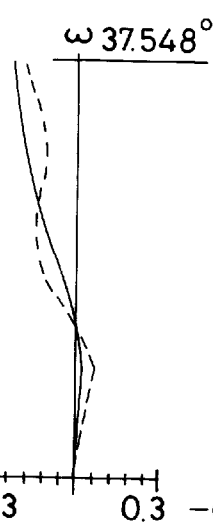 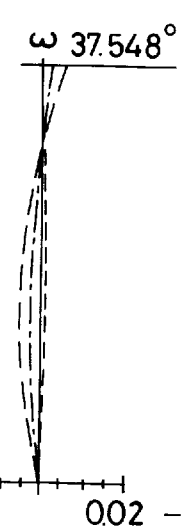 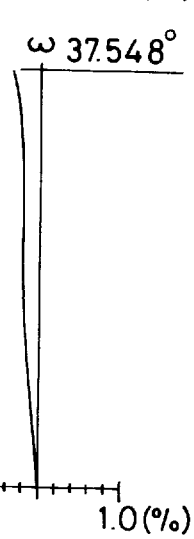
FIG.18(a)　FIG.18(b)　FIG.18(c)　FIG.18(d)
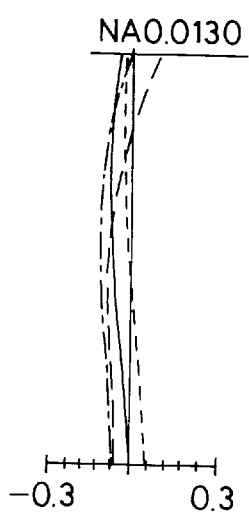 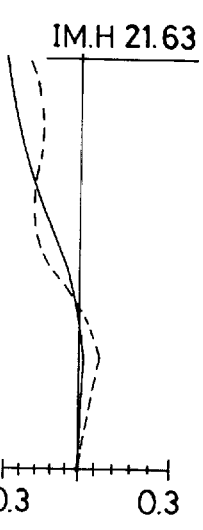 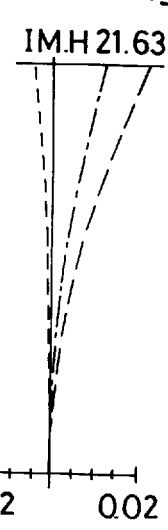 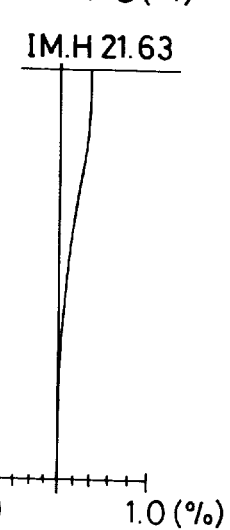
FIG.18(e)　FIG.18(f)　FIG.18(g)　FIG.18(h)

WIDE-ANGLE LENS SYSTEM

BACKGROUND OF THE INVENTION

The present invention relates generally to a wide-angle lens system, and more particularly to a symmetrical wide-angle lens system of relatively small size, which is suitable for use on optical systems for photographic lenses and electronic image devices, and has a wide field angle and a large aperture ratio.

Among wide-angle lens systems having a field angle of about 72° or more, image-forming lenses for single-lens reflex cameras are required to include a mirror-movable space. It has thus been proposed to use an inverted telephoto lens type comprising a front group of negative refracting power and a rear group of positive refracting power in order from an object side, thereby securing a back focus. This type has been still less than satisfactory in terms of off-axis aberrations because of an asymmetric refracting power profile with respect to an aperture stop. With an aperture ratio increase in particular, chromatic aberration of magnification, curvature of field, sagittal coma and the like have tended to become noticeably worse. Moreover, this has been responsible for an increase in the number of lenses involved, a lowering of transmittance, and the occurrence of ghost images at lens surfaces.

On the other hand, limitations imposed on the back focuses of cameras having range finders are not strict. Symmetrical wide-angle lens systems favorable for aberration correction have been proposed as unique spherical systems, as typically disclosed in U.S. Pat. Nos. 2,721,499 and 2,781,695.

These symmetrical wide-angle lens systems have been applied not only to photographic lenses but to aerial photogrammetry as well. Furthermore, they have been used as optical systems for copying purposes. However, they have generally been of small aperture ratios because the first lens group has a negative refracting power, and so an axial bundle of convergent rays is incident on the second lens group, resulting in some difficulty in correction of aberrations.

These optical systems have as a rule been optically designed using a specific object distance as a standard, and focusing from an object at infinity on a finite object has generally been carried out by the movement of the whole systems.

SUMMARY OF THE INVENTION

Situations being like this, an object of the present invention is to provide an optical system which is applicable to a photographic lens or electronic image equipment, and provides a solution to the problem associated with enlarging the aperture ratio of the above-mentioned symmetrical wide-angle lens system so that sagittal coma and curvature of filed can be well corrected to enable the optical system to have sufficient vignetting factor. Another object of the present invention is to provide a wide-angle lens system which is well improved in terms of aberration performance during focusing as well as maneuverability.

According to the present invention, the above-mentioned objects are achieved by the provision of a wide-angle lens system comprising, basically in order from an object side, a first lens group having a negative refracting power, a second lens group having a positive refracting power with an aperture stop located between, and a third lens group having a negative refracting power, characterized in that:

said second lens group is divided into front and rear sub-groups $G_{21}$ and $G_{22}$, each having a positive refracting power, between which said aperture stop is located, said first lens group comprises at least one negative meniscus lens convex on the object side, said front sub-group of said second lens group comprising at least one set of cemented lens containing a positive lens and a negative lens, and said rear sub-group of said second lens group comprising at least one set of cemented lens containing a positive lens and a negative lens, said third lens group comprises at least one negative meniscus lens convex on an image side, and any one of said lens groups includes an aspherical surface.

According to the present invention, there is also provided a first focusing method for focusing a wide-angle lens system comprising, basically in order from an object side, a first lens group having a negative refracting power, a second lens group having a positive refracting power with an aperture stop located between, and a third lens group having a negative refracting power, said second lens group being divided into front and rear sub-groups $G_{21}$ and $G_{22}$, each having a positive refracting power, between which said aperture stop is located, said first lens group comprising at least one negative meniscus lens convex on the object side, said front sub-group of said second lens group comprising at least one set of cemented lens containing a positive lens and a negative lens, said rear sub-group of said second lens group comprising at least one set of cemented lens containing a positive lens and a negative lens, and said third lens group comprising at least one negative meniscus lens convex on an image side, characterized in that:

focusing from an object at infinity on a finite object is carried out by moving the whole system toward the object side and, at the same time, varying spacings between said lens groups or an internal space of a given lens group, thereby making aberration variation correction.

According to the present invention, there is further provided a second focusing method for focusing a wide-angle lens system comprising, basically in order from an object side, a first lens group having a negative refracting power, a second lens group having a positive refracting power with an aperture stop located between, and a third lens group having a negative refracting power, said second lens group being divided into front and rear sub-groups $G_{21}$ and $G_{22}$, each having a positive refracting power, between which said aperture stop is located, said first lens group comprising at least one negative meniscus lens convex on the object side, said front sub-group of said second lens group comprising at least one set of cemented lens containing a positive lens and a negative lens, said rear sub-group of said second lens group comprising at least one set of cemented lens containing a positive lens and a negative lens, and said third lens group comprising at least one negative meniscus lens convex on an image side, characterized in that:

focusing from an object at infinity on a finite object is carried out by moving the whole system toward the object side and, at the same time, varying spacings between said lens groups or an internal space of a given lens group, thereby making aberration variation correction.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 9 is aberration diagrams of Example 1 upon focused on an infinite object point and comparative aberration diagrams of Example 1 upon focused on a finite object point of 0.5 m from the first lens surface;

FIG. 11 is aberration diagrams of Example 3 similar to those of FIG. 9;

FIG. 16 is aberration diagrams of Example 8 similar to those of FIG. 9;

FIG. 17 is aberration diagrams of Example 9 similar to those of FIG. 9; and

FIG. 18 is aberration diagrams of Example 10 similar to those of FIG. 9.

DESCRIPTION OF THE PREFERRED EMBODIMENTS

Figure 1:
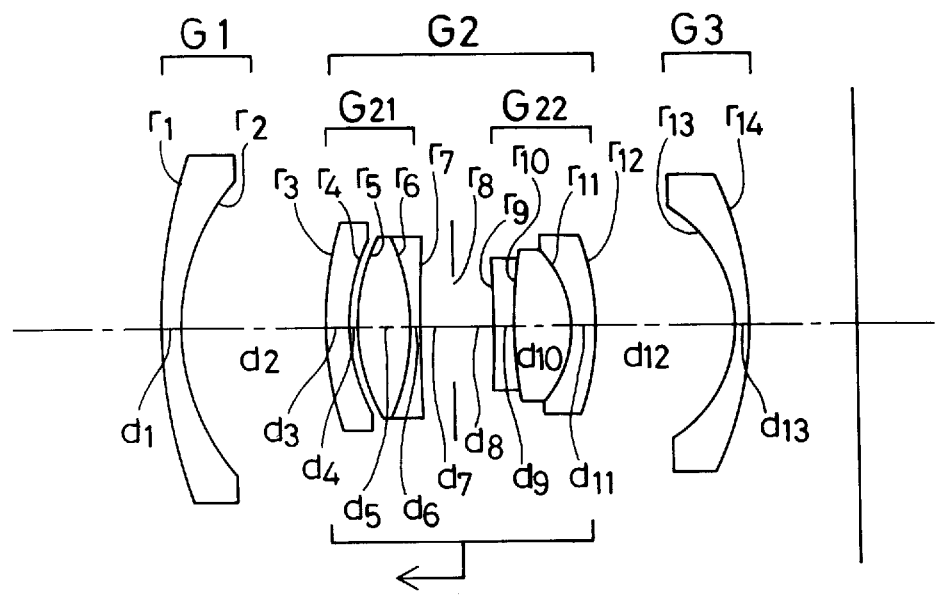
FIG. 1 is a sectional schematic of Example 1 of the wide-angle lens system according to the present invention.

A detailed account will now be given of why the above-mentioned arrangements are used in the present invention and how they function.

A symmetrical wide-angle lens system to which the present invention is applied comprises negative meniscus lens groups located in front of and behind a converging component including an aperture stop in nearly concentric relation thereto. This optical system is not only very favorable for aberration correction, but also makes it easy to correct sagittal coma that becomes noticeably worse in the case of a wide-angle system and is hardly corrected by use of an spherical optical system alone. Furthermore, the symmetry of this optical system enables distortion expanded into a power series of the angle of field to be easily corrected.

For photographic lenses or the like, it is required to produce a well-flattened image from the center to the periphery of a picture image. However, this requirement has been a difficult-to-solve problem for wide-angle lenses. When description is taken into consideration or fine grain film is used, on the other hand, an optical system is required to be of large aperture. The above-mentioned U.S. Pat. No. 2,721,499 discloses a wide-angle lens system having a relatively large aperture ratio of 1:3.4 even at a constant field angle and a field angle of 90°, wherein the first lens group is composed of two negative meniscus lenses. Set forth in U.S. Pat. No. 3,154,628 is another wide-angle lens system having a field angle of 120° and an aperture ratio of 1:5.6, wherein the first and third lens groups are each composed of three negative meniscus lenses.

A specific object of the present invention is to introduce improvements in these prior art optical systems by use of state-of-the-art fabrication technology and, to achieve this, there is provided a wide-angle lens system allowed to have a large aperture ratio by effective use of aspherical lens yet without causing any deterioration of distortion, sagittal coma and the like.

The wide-angle lens system of the present invention will now explained more illustratively with reference to the required conditions.

The optical system of the present invention comprises a second lens group that is an image-forming component having an aperture stop. By use of this second lens group alone, however, it is difficult to achieve any desired wide-angle design. For this reason a first lens group having a negative refracting power is located on the object side, so that the angle of incidence of light on the second lens group can be gentle, thereby making satisfactory sagittal coma correction. The provision of a dispersive lens group has an action on achieving a long back focus. Furthermore, the provision of a third lens group having a negative refracting power makes it possible to make correction for curvature of field, by which conventional wide-angle lens systems are remarkably characterized. These properties result from the basic arrangement of the present optical system. Of course, the symmetry of the present optical system enables chromatic aberration of magnification and distortion to be very well corrected. However, if the actual paraxial arrangement differs from the above-defined basic arrangement, it then goes without saying that remnants of distortion and chromatic aberration of magnification are still present although apparent symmetry is maintained. In what follows, a detailed account will be given of the conditions concerning the fundamental paraxial refracting power profile of the optical system.

$$0.2 < -f_1/f < 30 \tag{1}$$

$$0.15 < f_1/f_3 < 25 \tag{2}$$

$$0.2 < f_{21}/f_{22} < 5 \tag{3}$$

$$-3 < e'/f < 20 \tag{4}$$

where $f_1$: the focal length of the first lens group;

$f_3$: the focal length of the third lens group;

f: the focal length of the entire system;

$f_{21}$: the focal length of the front sub-group of the second lens group;

$f_{22}$: the focal length of the rear sub-group of the second lens group; and e': the principal point spacing when the first lens group and the front sub-group of the second lens group are taken as being one lens group and the rear sub-group of the second lens group and the third lens group are taken as being one lens group.

First of all, condition (1) defines the refracting power of the first lens group. Falling below the lower limit of 0.2 in this condition is preferable for compactness, but is not preferable for aberration correction because the number of lenses involved increases. Exceeding the upper limit of 30 is very favorable for aberration correction, but is not desired because the first lens group increases in size; so the size of the third lens group must be increased to compensate for this.

Condition (2) indicates the refracting power ratio between the first and third lens groups, and defines the symmetry of the negative lens groups. When the lower limit of 0.15 is not reached, the relative refracting power of the first lens group becomes large, resulting not only in the need of composing the first lens group of a plurality of lens sub-groups but also in some considerable increase in sagittal coma, which renders it necessary to increase the size of the first lens group itself. Furthermore, remnants of aberrations are increased throughout the overall system for lack of symmetry. Exceeding the upper limit of 25 is not preferable because the refracting power of the third lens group becomes relatively large, thus resulting in lack of symmetry and difficulty with which flatness of field, chromatic aberration of magnification, and distortion are corrected.

Condition (3) defines the ratio between the refracting powers of the front sub-group $G_{21}$ and rear sub-group $G_{22}$, and represents the symmetry of the refracting power with respect to the aperture stop. When the lower limit of 0.2 is not reached, the relative refracting power of the front sub-group becomes too large for correction of spherical aberration as well as of aberrations that can be corrected due to symmetry. Exceeding the upper limit of 5 is not preferable because the relative refracting power of the rear sub-group becomes rather too large, ending up in an increase in spherical aberration and astigmatism, and difficulty with which meridional coma is corrected.

Condition (4) is given to define the principal point spacing between the first and third lens groups. When the lower limit of −3 is not reached, the optical system may be made compact, but the refracting powers of the lens groups inclusive of the first lens group are likely to become large and so unreasonable for aberration correction. Exceeding the upper limit of 20 is tantamount to an increased actual spacing between the first and third lens groups, and is not desired because the size of the first lens group becomes larger than required.

Another specific object of the present invention is to make the optical system wide-angle and have a large aperture ratio by the addition of an aspherical surface or surfaces to the above-defined basic optical arrangement. This is substantially tantamount to reducing the overall length of the optical system and the number of lenses involved; in other words, this is equivalent to controlling the refracting power of a given surface or surfaces by the aspherical surface or surfaces.

The main object of the present invention is to meet demands of high specifications. In the present invention, it is recognized that the ability of an optical system to form images is neither maintained nor improved without causing any vignetting factor drop unless some modification is made thereto; in other words, if that ability is maintained or improved, there is then an increase in the sensitivity of the optical system to decentering errors alone. In the present invention, therefore, the above-defined desired wide-angle design having a large aperture ratio is logically achieved by determining what form of aberration is to be corrected and what form of aspherical surface is to be used to this end.

A specific example of using an aspherical surface for the purpose of making correction for spherical aberration occurring incidental to the achievement of the desired large aperture ratio and maintaining the desired vignetting factor, thereby making correction for bundles of off-axis rays with an increased quantity of light, especially a bundle of marginal rays will now be explained through Example 1 to be described later with numerical data.

In this example, weight is given to improvements in the ability of the optical system to form images and reductions in the overall length of the optical system although the optical system has a common aperture ratio in view of specifications. In an optical system of the negative group preceding type where the first lens group has a negative refracting power such as one contemplated in the present invention, the second lens group plays a great share in correction of spherical aberration, because a divergent bundle of rays is incident on the second lens group. By making the surface of the second lens group contributing to spherical aberration correction aspheric, undercorrected spherical aberration is allowed to assume the full correction type. Under the influence of curvature of field, a wide-angle lens system often produces a peripheral image surface which is not flattened and so has a direct relation to malfunction. To make correction for the peripheral image surface, an aspherical surface can be used for the surface of the final lens group which is effective for that correction. Contrary to a converging lens, the aspherical surface functions to increase the dispersive refracting power with respect to a bundle of marginal rays, so that the image surface can be erected to increase the flatness thereof.

Then, reference will be made to the action of the optical system of Example 1. The lens arrangement of this example is illustrated in section in FIG. 1. Spherical aberration overcorrected by a first lens group G1 is corrected by the converging action of a second lens group G2 while overcorrection larger than required is avoided by using an aspherical surface for the first surface of the second lens group G2. In particular, the final refracting surface of the second lens group G2 has a strong converging action. The spherical aberration is compensated for by the dispersive action of a third lens group G3, and then reaches the image surface. The third-order spherical aberration coefficient is undercorrected while the fifth-order spherical aberration coefficient is overcorrected, so that the spherical aberration can be well corrected throughout the optical system. Referring here to the fifth-order spherical aberration coefficient, aberrations occurring at the first aspherical surface and final surface of the second lens group G2 are so quantitatively large that they can be mutually corrected. The action of the seventh-order aberration coefficient is very gentle.

The coma coefficient is undercorrected by the first and second lens groups G1 and G2, but has an action on erecting the image surface by the third lens group G3. Here, too, aberrations are produced at both the first aspherical surface of the second lens group G2 and the final surface of the second lens group G2. This also holds for higher-order aberration correction coefficients.

Astigmatism, when considered in the form of a group, is similar in the state of correction to coma; in other words, it enables the image surface undercorrected by the first and second lens groups G1 and G2 to be erected by the third lens group G3. Referring here to the action of higher-order aberration coefficients, however, the fifth-order aberration coefficient functions to make correction for the image surface as a result of the use of an aspherical surface for the concave surface of the third lens group G3.

Distortion, too, is well corrected by the action of the aspherical surface of the third lens group G3.

Numerical examples of the aberration coefficients in this example are set out for each lens group in Table 1. It is noted that the values of the aberration coefficients produced under the action of the aspherical surface of the third lens group G3 are underlined.

TABLE 1

|  | $SA_3$ | $SA_5$ | $CM_3$ | $CM_5$ | $AS_3$ | $AS_5$ | $DT_3$ | $DT_5$ |
|---|---|---|---|---|---|---|---|---|
| 1st group | 0.04287 | 0.0025 | −0.0629 | −0.00089 | −0.01766 | 0.0017 | −0.61219 | 0.12823 |
| 2nd group | −0.09276 | 0.00795 | −0.1549 | −0.06756 | −0.07656 | 0.06185 | −0.27615 | 0.13781 |
| 3rd group | 0.03201 | 0.00334 | 0.26607 | 0.01467 | 0.19953 | −0.74142 | 1.75811 | −5.49181 |
| Σ | −0.01789 | 0.01378 | 0.04826 | −0.05378 | 0.10532 | −0.67786 | 0.86977 | −5.22577 |

Higher-order coma aberrations, too, are subjected to the action of the aspherical surface of the third lens group G3. In other words, it is understood that in the case of a conventional spherical system the correction of off-axis aberrations or astigmatism, distortion and coma are still less than satisfactory in view of the achievement of the desired wide-angle design having a large aperture ratio.

In Table 1 as mentioned above, $SA_3$, $SA_5$, $CM_3$, $CM_5$, $AS_3$, $AS_5$, $DT_3$, and $DT_5$ are the third-order spherical aberration coefficient, the fifth-order spherical aberration coefficient, the third-order coma coefficient, the fifth-order coma coefficient, the third-order astigmatism coefficient, the fifth-order astigmatism coefficient, the third-order distortion coefficient, and the fifth-order distortion coefficient, respectively. Σ represents the sum total of the aberration coefficients per lens group. In this example, the second lens group G2 comprises an air lens which provides an aberration-producing surface and so has a relation to delicate correction of aberrations. Remnants of high-order aberrations present there can be well balanced with high-order aberrations produced at the aspherical surface.

group G2, and one in a third lens group G3. More specifically, with the basic lens layout alone, it is difficult to meet demands of high specifications when the desired refracting power profile is determined depending on correction of chromatic aberration, if the lens system lacks the capability of correcting various aberrations. By effective use of the aspherical surfaces, however, it is possible to improve the ability of the optical system to form images.

The first surface of the first lens group G1, because of making use of an aspherical surface, acts directly on correction of distortion that is one of off-axis aberrations. This surface of the first lens group G1 has also an action on the relaxation of a bundle of off-axial rays directed to the second lens group G2, so that the occurrence of sagittal coma can be inhibited. In this case, overcorrected coma is so produced that the overall system can rather be placed in a well-balanced state. This action becomes stronger as the angle of field becomes wider. U.S. Pat. No. 3,132,199 discloses a spherical system of the same specifications wherein the above-mentioned problem is solved by use of many negative meniscus lenses. However, this is nothing but an example showing that how difficult is it to satisfy the demanded capability of forming images.

The aspherical surface used for the final surface of the rear sub-group $G_{22}$ of the second lens group G2 makes it easy to correct off-axis meridional coma, astigmatism, distortion, and curvature of field. The use of the aspherical surface for the convex surface of the meniscus lens of the third lens group G3 makes a contribution to correction of off-axis coma, distortion, and curvature of field. Set out in Table 2 are the aberration coefficients of the lens groups used in this example.

TABLE 2

|  | $SA_3$ | $SA_5$ | $CM_3$ | $CM_5$ | $AS_3$ | $AS_5$ | $DT_3$ | $DT_5$ |
|---|---|---|---|---|---|---|---|---|
| 1st group | 0.07095 | 0.0067 | −0.40601 | −0.04613 | 0.25962 | −0.03896 | −1.87280 | 0.54515 |
| 2nd group | −0.11656 | 0.04792 | 0.23886 | 0.25829 | −0.40952 | 0.11010 | 0.06285 | 0.56511 |
| 3rd group | 0.01487 | 0.00115 | 0.15299 | 0.00939 | 0.18057 | −0.21544 | 2.14757 | −3.36526 |
| Σ | −0.03074 | 0.05577 | −0.01416 | 0.22154 | 0.03067 | −0.14430 | 0.33762 | −2.25501 |

The action of an optical system having a field angle of about 90° and an aperture ratio of about 1:2.8 will now be explained with reference to Example 7 to be described later. As can be seen from the sectional schematic of FIG. 5, the lens layout according to this example is of the symmetrical type and very simple in construction. Three aspherical lenses are used, one in a first lens group G1, one in a second lens Here, the aspherical surface used for the first surface of the first lens group G1 has an eccentricity of 1, and the magnitude of the action thereof on a bundle of marginal rays is as large as expressed by an aspheric quantity of 396 μm in the vicinity of the effective aperture. In particular, the intrinsic surface coefficients of the aspherical surfaces used have such large values as set out in Table 3.

TABLE 3

|  | SA$_3$ | SA$_5$ | CM$_3$ | CM$_5$ | AS$_3$ | AS$_5$ | DT$_3$ | DT$_5$ |
|---|---|---|---|---|---|---|---|---|
| 1st surface | 0.00129 | 0.00013 | −0.09522 | −0.00262 | 0.10555 | 0.00011 | −0.92766 | 0.18319 |
| 9th surface | −0.7110 | 0.05596 | 0.74665 | 0.28818 | −0.18588 | 0.03465 | 0.69385 | −0.36207 |
| 11th surface | −0.00831 | −0.00045 | 0.01565 | 0.00422 | 0.09016 | −0.19631 | 1.05322 | −2.46005 |

From the aberration coefficients shown in Table 3 of the aspherical surfaces used, it is found that spherical aberration is greatly affected by the aspherical surface of the second lens group G2 while coma is largely affected by the aspherical surfaces of the first and second lens groups G1 and G2. Of the astigmatism coefficients, the third-order aberration coefficient is subjected to the action of the aspherical surface of each lens group, but from the state of the higher-order aberrations produced it is understood that the aspherical surface of the third lens group G3 makes a great contribution to the third-order aberration coefficient. The same also holds for distortion; the aspherical surface of the third lens group G3 makes a great contribution thereto.

Figure 8:
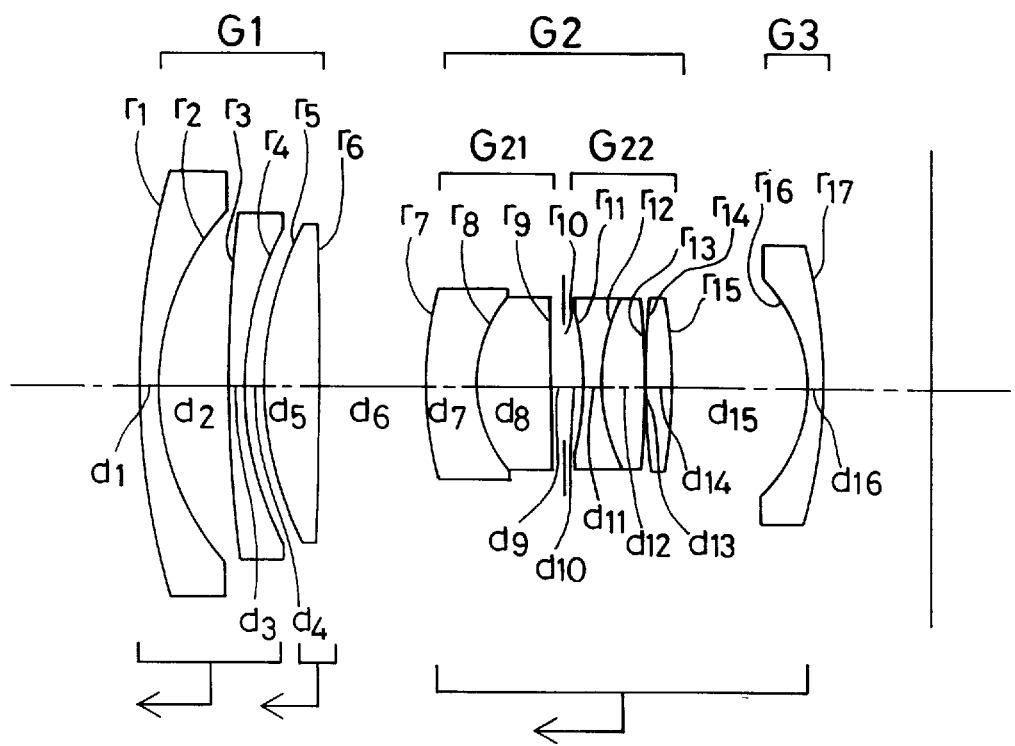
FIG. 8 is a sectional schematic of Example 10 of the wide-angle lens system according to the present invention.
Figure 10A:
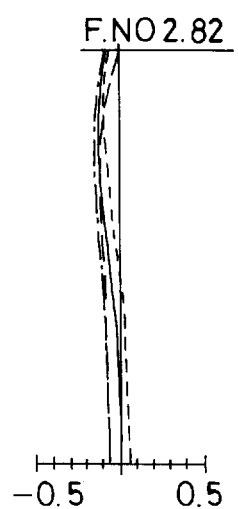
FIG. 10 is aberration diagrams of Example 2 similar to those of FIG. 9.
Figure 10B:
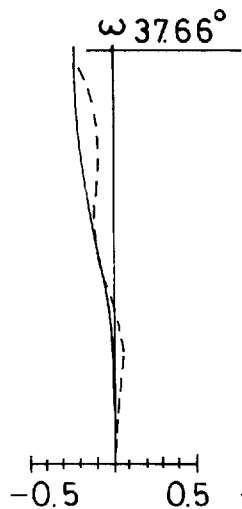
Figure 10C:
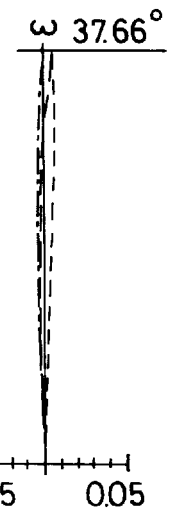
Figure 10D:
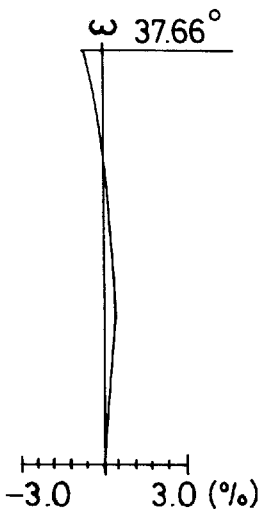
Figure 10E:
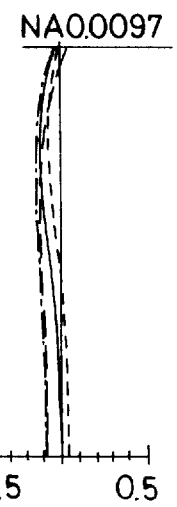
Figure 10F:
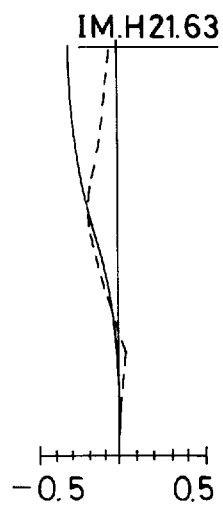
Figure 10G:
Figure 10H:
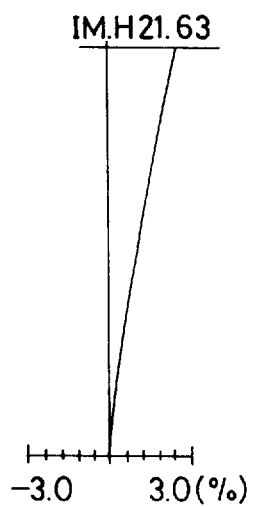
Figure 12A:
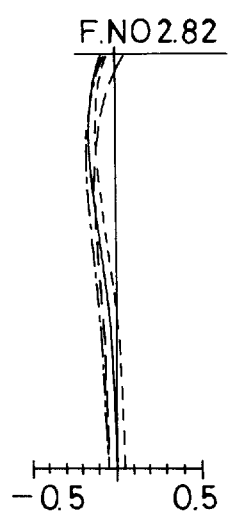
FIG. 12 is aberration diagrams of Example 4 similar to those of FIG. 9.
Figure 12B:
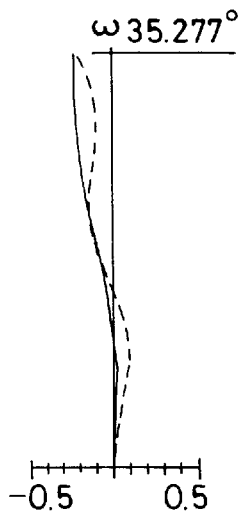
Figure 12C:
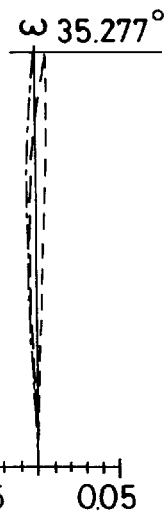
Figure 12D:
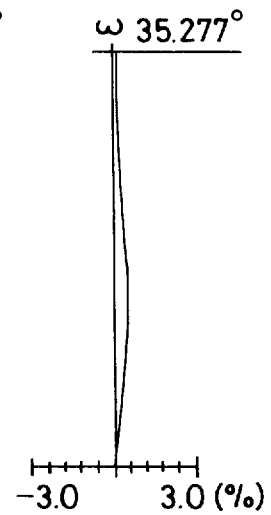
Figure 12E:
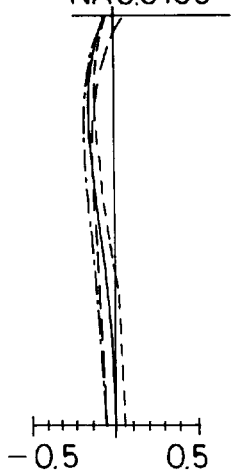
Figure 12F:
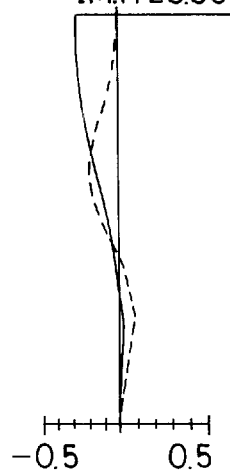
Figure 12G:
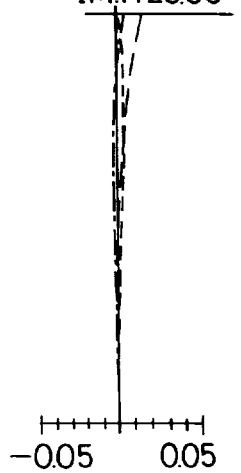
Figure 12H:
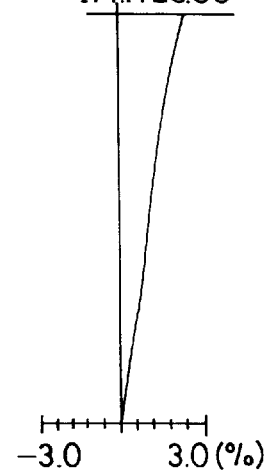
Figure 13A:
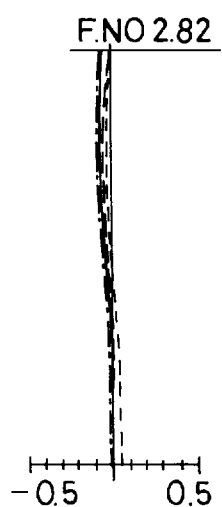
FIG. 13 is aberration diagrams of Example 5 similar to those of FIG. 9.
Figure 13B:
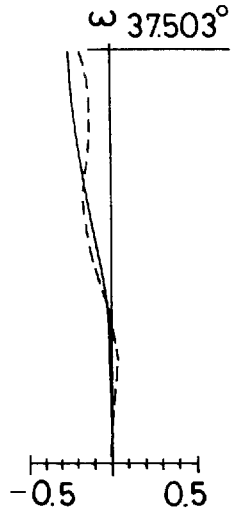
Figure 13C:
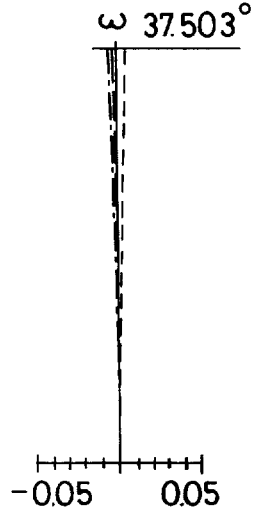
Figure 13D:
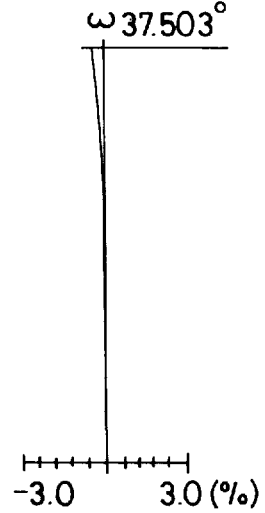
Figure 13E:
Figure 13F:
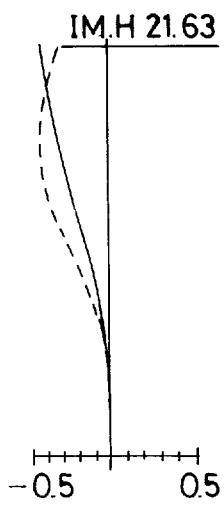
Figure 13G:
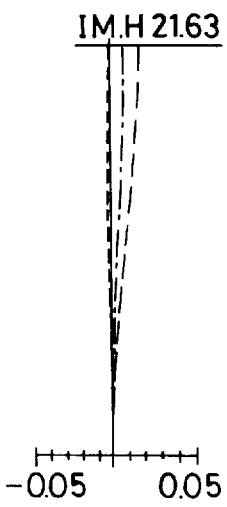
Figure 13H:
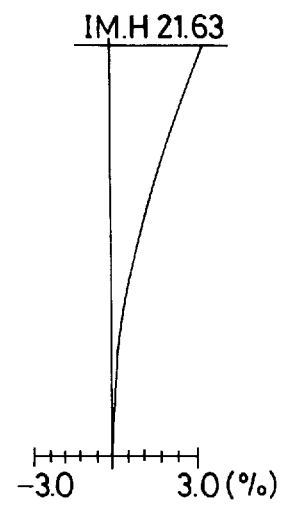
Figure 14A:
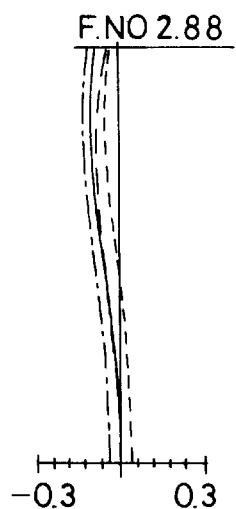
FIG. 14 is aberration diagrams of Example 6 similar to those of FIG. 9.
Figure 14B:
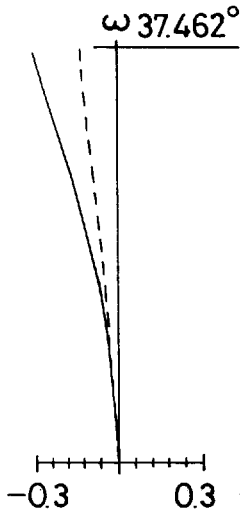
Figure 14C:
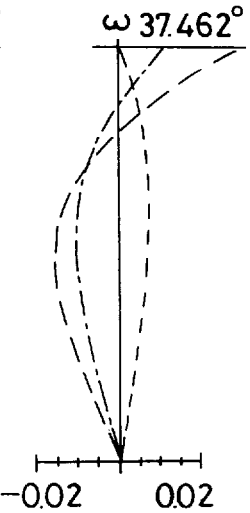
Figure 14D:
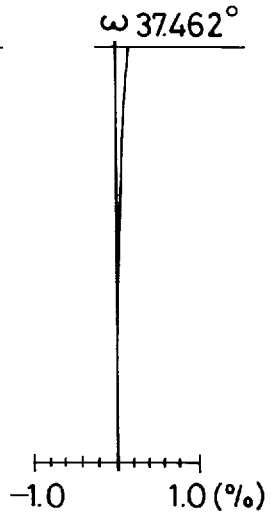
Figure 14E:
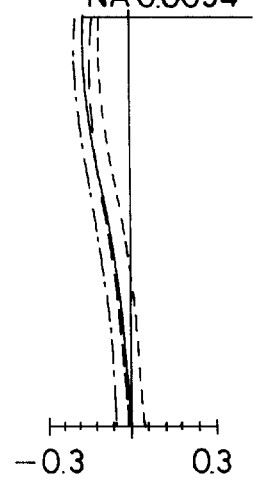
Figure 14F:
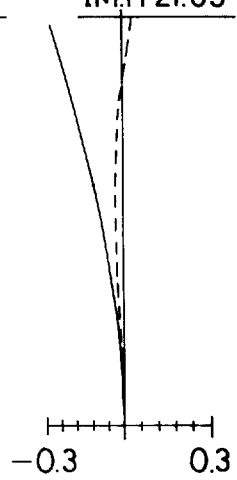
Figure 14G:
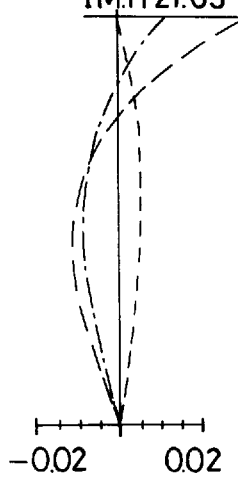
Figure 14H:
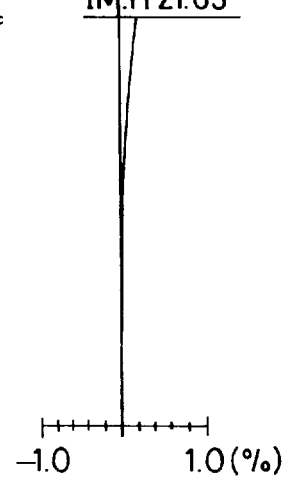
Figure 15A:
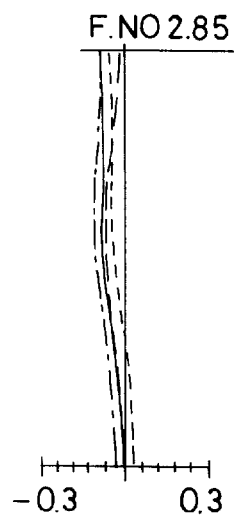
FIG. 15 is aberration diagrams of Example 7 similar to those of FIG. 9.
Figure 15B:
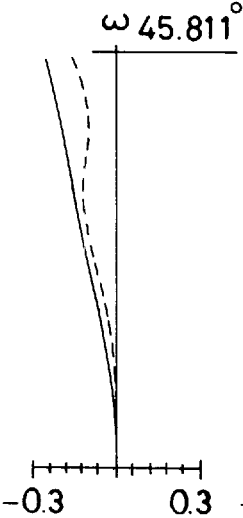
Figure 15C:
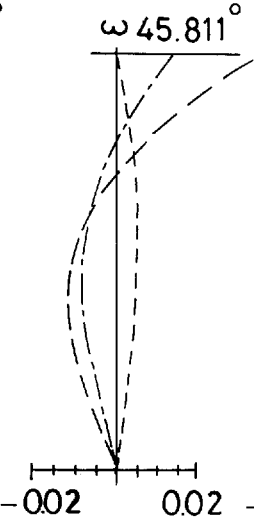
Figure 15D:
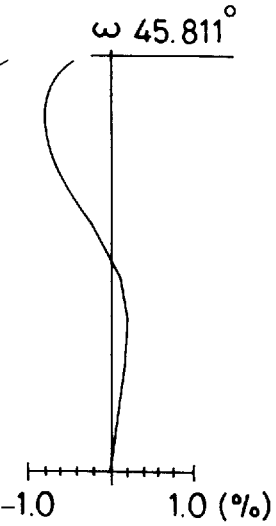
Figure 15E:
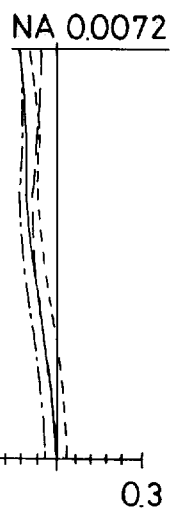
Figure 15F:
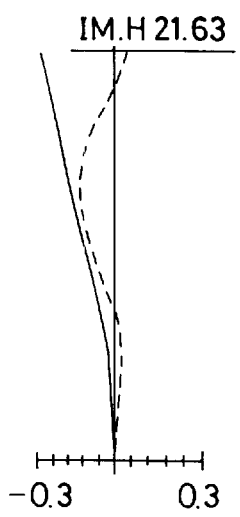
Figure 15G:
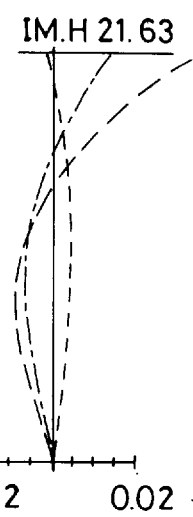
Figure 15H:
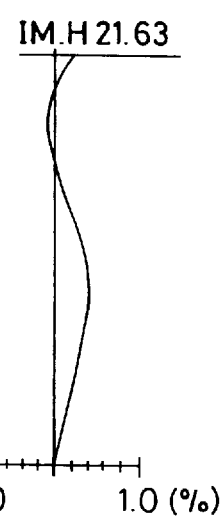

Referring further to the action of the aspherical surfaces on aberration correction, the same effect is expectable even when aspherical surfaces are used for the concave surfaces of the first and second lens groups G1 and G2, as will be understood from Example 10 to be given later. The optical system of this example has a field angle of about 75° and an aperture ratio of 1:2.08 that is relatively larger than that of this type of lens system. An aspherical surface is used for the concave surface of a negative meniscus lens in a first lens group G1 while aspherical surfaces are used for the first surface of a second lens group G2 and the concave surface of a negative meniscus lens in a third lens group G3 for the purpose of making satisfactory correction for a variety of off-axis aberrations including chromatic aberration, thereby enabling the optical system to have a sufficient vignetting factor and excel in the capability of forming images. This lens layout is shown in FIG. 8 while FIG. 18 is aberration diagrams thereof.

A detailed account will now be given of why and how the first focusing method is used in the present invention.

A symmetrical wide-angle lens system to which the present invention is to be applied comprises negative lens groups in front of and behind a converging component including an aperture stop in nearly concentric relation thereto. As can be seen from the above-mentioned proposals, this optical system is ideal for aberration correction. It is thus believed that sagittal coma which becomes noticeably worse in the case of a wide-angle system is not only easily corrected, but distortion expanded into a power series as a function of the angle of field can also be relatively easily corrected due to its symmetry.

In the case of a photographic lens or other optical system required to take shots of objects at infinity or short distance objects, however, there is a difference in the ratio of speed of movement between the center best image plane and the off-axis best image plane if a conventional focusing method is used wherein the entire system is moved. This has resulted in some considerable deterioration of the quality of the off-axis image surface.

In the case of a large format camera, on the other hand, quick focusing has not always been achieved by reason of the driving or movement of a large lens, changes in the overall length thereof, etc. Furthermore, the number of lenses forming a first or third lens group has tended to increase although depending on the angle of field and aperture ratio used.

It has now been found that all the problems associated with such lens systems can be solved by focusing methods based on the following construction.

To achieve this, the present invention provides an wide-angle lens system comprising three basic lens groups, i.e., in order from an object side, a first lens group having a negative refracting power, a second lens group including an aperture stop and having a positive refracting power and a third lens group having a negative refracting power, said second lens group divided into rear and front sub-groups $G_{21}$ and $G_{22}$, each having a positive refracting power, between which an aperture stop is located, said first lens group comprising at least one negative meniscus lens convex on the object side, said front sub-group of said second lens group comprising at least one set of cemented lens including a positive lens and a negative lens while said rear sub-group of said second lens group comprising at least one set of cemented lens including a positive lens and a negative lens, and said third lens group comprising at least one negative meniscus lens convex on an image side, wherein:

focusing from an object at infinity on a finite object is carried out by an inner focusing method in which said second lens group is moved from a reference position toward the object side without causing any change in the overall length of said wide-angle lens system, while the spacing between said first and second lens groups decreases with an increase in the spacing between said second and third lens groups. It is then desired that the following conditions be satisfied:

$$0.2 < -f_1/f < 3 \tag{1)'}$$

$$0.03 < e_{12}/f < 1 \tag{5}$$

$$0.2 < f_{21}/f_{22} < 2 \tag{3)'}$$

$$0.15 < f_1/f_3 < 2.5 \tag{2)'}$$

where $f_1$: the focal length of the first lens group;

$f_3$: the focal length of the third lens group;

f: the focal length of the entire system;

f21: the focal length of the front sub-group $G_{21}$ of the second lens group;

f22: the focal length of the rear sub-group $G_{22}$ of the second lens group, and $e_{12}$: the principal point spacing between the first lens group and the front sub-group of the second lens group.

During focusing from an object at infinity to an object at a finite distance, the second lens group is moved from the reference position toward the object side while the spacing between some lenses of said front and rear sub-groups $G_{21}$ and $G_{22}$ forming said second lens groups changes, so that aberration variations during focusing can be compensated for, thereby achieving high image quality over a wide range.

In what follows, the above-defined lens layout will be explained with reference to its specific action and effect.

In the present lens system, the converging component defined by the second lens group comprises front and rear sub-groups having a composite positive refracting power, between which the aperture stop is located; that is to say, the optical system is symmetrical with respect to the aperture stop. This lens system is expected to have a large aperture ratio. To achieve a wide-angle lens layout, the negative lenses are located concentrically with respect to the stop for achieving symmetry, so that the angle of incidence of light on the converging component can be relaxed to make correction of sagittal coma easy.

An account will here be given of the paraxial conditions. First of all, the above-mentioned condition (1)' defines the refracting power of the first lens group. It is desired that the first lens group satisfies the abovementioned condition (1)', and it is particularly desired that the upper limit be set at 3, as defined by condition (1)'.

Then, condition (5) is given to define the principal point spacing between the first and second lens groups. When the lower limit of 0.03 is not reached, it is possible to make the lens system compact, but the refracting powers of the lens groups including the first lens group tend to increase and so are unreasonable for aberration correction. Exceeding the upper limit of 1 is tantamount to an increase in an actual spacing between the first and second lens groups, and is not desired because the size of the first lens group becomes larger than required.

Condition (3)' is given to define the ratio of the refracting power between the front and rear groups $G_{21}$ and $G_{22}$ forming the second lens group. It is desired that the front and rear sub-groups $G_{21}$ and $G_{22}$ meet the above-mentioned condition (3)', and it is particularly desired that the upper limit thereof be set at 2, as defined by condition (3)'.

Condition (2)' is given to define the ratio of the refracting power between the first and third lens groups. It is desired that this ratio conform to the above-mentioned condition (2)', and it is particularly desired that the upper limit thereof be set at 2.5, as is the case with condition (2)'.

Under the above-mentioned conditions for the paraxial refracting power, the present invention puts forward a first focusing method.

As already mentioned, focusing from an object at infinity to an object at a finite distance is carried out by the inner focusing method wherein the second lens group is moved from the reference position toward the object side without causing any change in the overall length of the optical system, while the spacing between the first and second lens groups decreases with an increase in the spacing between the second and third lens groups, so that the maneuverability of the optical system can be improved while the purpose of correcting aberrations can be optically well achieved. This will now be explained more specifically. Since the aperture stop is included in the second lens group, the optical system should have a mechanism for driving the aperture stop simultaneously.

The inner focusing method according to the present invention is specifically characterized in that while the first and third lens group remain fixedly held, the aperture stop-containing second lens group alone is moved for focusing on an object at a finite distance. To determine whether or not the lens system of the present invention is capable of correcting aberration variations incidental to the focusing involving the movement of the second lens group, it is required that attention be directed to changes in the intrinsic aberration coefficients of each lens group based on the designed refracting power profile.

Of importance, on the other hand, is the action of the spacing between the lens groups, which change as the second lens group moves. In other words, it is required that aberration variations caused by changes in the actual spacing due to the extension of the second lens group be balanced with aberration variations caused by changes in the angle of incidence which occur upon focused on an object at a finite distance. The above-mentioned problem will now be explained with reference to Example 1 to be given later.

First, whether or not principal ray aberrations can be corrected upon changes in the actual spacing which change during focusing is examined.

TABLE 4

|    | $\Delta_f$ | $\Delta B_f$ | $\Delta S_a$ | $\Delta D_s$ | $\Delta D_m$ |
|----|--------|--------|--------|---------|---------|
| D1 | 0.0456 | 0.0157 | 0.0016 | −0.0023 | −0.0080 |
| D2 | −0.0744 | −0.1565 | −0.0073 | −0.0008 | 0.0132 |

$D_1$: a change in the spacing between the first and second lens groups;
$D_2$: a change in the spacing between the second and third lens groups;
$\Delta f$: a focal length change;
$\Delta B_f$: a back focus change;
$\Delta S_a$: a zonal spherical aberration;
$\Delta D_s$: an astigmatism change in the sagittal direction; and
$\Delta D_m$: an astigmatism change in the meridional direction The above-mentioned Table 4 shows how aberrations vary depending on the actual spacing in Example 1, which changes as the second lens group is moved for the purpose of focusing. Table 4 sets out the values of the parameters which would change when assuming that the focusing lens group is extended out by 0.1 mm, and indicates that these values can be compensated for.

Set out below are the values of the third-order aberration coefficients.

TABLE 5

|           | $SA_3$   | $CM_3$  | $AS_3$   | $DT_3$   | $PT_3$   |
|-----------|----------|---------|----------|----------|----------|
| 1st group | 0.04287  | −0.0629 | −0.01766 | −0.61219 | 0.13633  |
| 2nd group | −0.09276 | −0.1549 | −0.07656 | −0.27615 | −0.40569 |
| 3rd group | 0.03201  | 0.26607 | 0.19953  | 1.75811  | 0.21092  |
| Σ         | −0.01789 | 0.04826 | 0.10532  | 0.86977  | −0.05845 |

TABLE 6

|           | $SA_3$   | $CM_3$   | $AS_3$   | $DT_3$   | $PT_3$   |
|-----------|----------|----------|----------|----------|----------|
| 1st group | 0.04400  | −0.05227 | −0.02345 | −0.52280 | 0.12782  |
| 2nd group | −0.09823 | −0.15314 | −0.07479 | −0.25978 | −0.38036 |
| 3rd group | 0.02814  | 0.24793  | 0.19942  | 1.76115  | 0.19775  |
| Σ         | −0.02909 | 0.04252  | 0.10117  | 0.97856  | −0.05480 |

$SA_3$: the third-order spherical aberration coefficient;
$CM_3$: the third-order coma coefficient;
$AS_3$: the third-order astigmatism coefficient;
$DT_3$: the third-order distortion coefficient;
$PT_3$: the third-order curvature-of-field coefficient; and
Σ: the sum total of the aberration coefficients throughout the system.

throughout the system.

Table 5 shows the third-order aberration coefficients of Example 1 per lens group upon focused on an object at infinity, while Table 6 shows those of Example 1 per lens group upon focused on an object distance of 0.5 m. From these, it is found that in the aberration coefficients, too, correction of variations of the fundamental aberrations is achievable. Further, even when remnants of aberrations are higher-order aberrations or the like, they can be compensated for by the inner focusing method involving the second lens group divided into two sub-groups between which a movable space is located. Furthermore, it is of course desired that this focusing method is extremely effective for the case where a little contribution is made to aberrations other than remnants of aberrations, as will be more specifically explained with reference to the examples.

Then, another focusing method will now be explained specifically. A lens system to which this method is to be applied is basically a symmetrical lens system of the following construction. As already described, the lens system to which this focusing method is to be applied comprises negative lens groups located in front of and behind a converging component including an aperture stop in nearly concentric relation thereto. With this focusing method, sagittal coma which becomes noticeably worse in the case of a wide-angle system is not only easily corrected, but distortion expanded into a power series as a function of the angle of field can also be relatively easily corrected due to its symmetry.

In the case of a photographic lens or other optical systems required to take shots of objects at infinity or short distance objects, however, there is a difference in the ratio of speed of movement between the center best image plane and the off-axis best image plane if a conventional focusing method is used wherein the entire system is moved. This has resulted in some considerable deterioration of the quality of the off-axis image surface.

It has now been found that all the problems associated with such lens systems can be solved by the focusing method based on the following construction. To accomplish this, the present invention provides an wide-angle lens system comprising three basic lens groups, i.e., in order from an object side, a first lens group having a negative refracting power, a second lens group including an aperture stop and having a positive refracting power and a third lens group having a negative refracting power, said second lens group divided into rear and front sub-groups $G_{21}$ and $G_{22}$, each having a positive refracting power, between which said aperture stop is located, said first lens group comprising at least one negative meniscus lens convex on the object side, said front sub-group of said second lens group comprising at least one set of cemented lens including a positive lens and a negative lens while said rear sub-group of said second lens group comprising at least one set of cemented lens including a positive lens and a negative lens, and said third lens group comprising at least one negative meniscus lens convex on an image side, wherein:

focusing from an object at infinity to a finite distance object is effected by moving the entire system toward the object side and, at the same time, varying the spacings between said lens groups or the internal space of a given lens group, thereby achieving aberration variation correction.

It is further desired that the following conditions be satisfied:

$$0.2 < f_{12}/f < 16 \quad (6)$$

$$-5 < f_{23}/f < 12 \quad (7)$$

$$-3 < e'/f < 1 \quad (4)'$$

where
- $f_{12}$: the composite focal length of the first lens group and the front sub-group of the second lens group;
- $f_{23}$: the composite focal length of the rear sub-group of the second lens group and the third lens group;
- f: the focal length of the entire system; and
- e': the principal point spacing between a sub-system comprising the first lens group and the front sub-group of the second lens group and a sub-system comprising the rear sub-group of the second lens group and the third lens group.

The above-mentioned conditions are now explained. Conditions (6), (7) and (4)' are all given to define the paraxial layout of the lens system as well as to define the refracting power profile of the entire system when weight is given to the symmetry of the entire system divided into object and image sides with respect to the aperture stop.

Condition (6) defines the refracting power of the front sub-group of the second lens group on the object side with respect to the aperture stop. Falling below the lower limit of 0.2 is favorable for achieving compactness, but is not desired because problems remain unsolved in connection with the occurrence of sagittal coma inherent in wide-angle lenses, and spherical aberration correction. Exceeding the upper limit of 16 is very favorable for aberration correction, but is not desired because the size of the first lens group becomes very large.

Condition (7) defines the refracting power of the rear sub-group of the second lens group located on the image side with respect to the aperture stop. Falling below the lower limit of −5 is favorable for shortening the entire length of the system, but is not desired because remnants of curvature of field and chromatic aberration of magnification are still present throughout the system. Exceeding the upper limit of 12 is favorable for aberration correction, but is not desired because of some inconveniences such as lack of the back focus when the lens system is of wide-angle design, and an increase of the entire length of the lens system.

Condition (4)' defines an aperture stop space. As a matter of course, it is very important for this space to have a proper value. It is desired that the space satisfy condition (4)', and it is particularly desired that the upper limit thereof be set at 1 as defined by Condition (4)'.

In what follows, the focusing method will be explained.

In the meantime, a lens system to which the present invention is to be generally applied, when used as a photographic objective, is widely applicable to so-called large format cameras providing a coverage from Leica to medium and large formats. In the focusing mechanism built in such a lens system, therefore, the entire system is moved depending on photographic purposes, and so no attempt to strictly correct or compensate for aberration variations is intended whatsoever. In the present invention, on the other hand, focusing is fundamentally carried out by moving the entire system as usual. To achieve high image quality even at a finite object distance while limiting aberration variations, any variation of longitudinal spherical aberration is reduced as much as possible, so that this variation and an off-axis best image plane can lie in the same direction. More specifically, aberration variations are compensated for by making the spacings between the lens groups movable. Provided that the same basic optical system is used, this may be applied to more or less modified lens layouts. As a matter of course it is possible to compensate for aberration variations by making the spacings between the lens groups movable and, at the same time, intentionally dividing a certain lens group into sub-groups.

This focusing method will now be explained specifically with reference to numerical data obtained in Example 6 to be given later. Example 6 is directed to a substantially symmetrical lens system in which an aperture stop is located between cemented lenses, each followed by one negative meniscus lens. Here, what effect is actually obtained by focusing is explained with reference to the third-order aberration coefficients given below.

TABLE 7

|  | $SA_3$ | $CM_3$ | $AS_3$ | $DT_3$ | $PT_3$ |
|---|---|---|---|---|---|
| 1st group | 0.10783 | −0.31541 | 0.09010 | −0.42964 | 0.16968 |
| 2nd group | −0.13632 | 0.20147 | −0.12303 | −0.50640 | −0.40277 |
| 3rd group | 0.01358 | 0.13110 | 0.03219 | 0.92297 | 0.21008 |
| Σ | −0.01491 | 0.01717 | −0.00074 | −0.01306 | −0.02301 |

TABLE 8

|  | $SA_3$ | $CM_3$ | $AS_3$ | $DT_3$ | $PT_3$ |
|---|---|---|---|---|---|
| 1st group | 0.10247 | −0.28843 | 0.07860 | −0.36324 | 0.15093 |
| 2nd group | −0.13475 | 0.18274 | −0.11423 | −0.42347 | −0.35826 |
| 3rd group | 0.01650 | 0.13904 | 0.03238 | 0.78245 | 0.18686 |
| Σ | −0.01579 | 0.03335 | −0.00325 | −0.00426 | −0.02047 |

$SA_3$: the third-order spherical aberration coefficient;
$CM_3$: the third-order coma coefficient;
$AS_3$: the third-order astigmatism coefficient;
$DT_3$: the third-order distortion coefficient;
$PT_3$: the third-order curvature-of-field coefficient; and
Σ : the sum total of the aberration coefficients throughout the system.

Table 7 indicates the third-order aberration coefficients of Example 6 per lens group upon focused on an object at infinity, and Table 8 sets forth the third-order aberration coefficients of Example 6 upon focused on an object distance of 0.5 m by the movement of the entire system.

TABLE 9

|  | $SA_3$ | $CM_3$ | $AS_3$ | $DT_3$ | $PT_3$ |
|---|---|---|---|---|---|
| 1st group | 0.10120 | −0.29490 | 0.08371 | −0.38128 | 0.15300 |
| 2nd group | −0.13470 | 0.18416 | −0.11564 | −0.43241 | −0.36317 |
| 3rd group | 0.01555 | 0.13600 | 0.03311 | 0.80875 | 0.18942 |
| Σ | −0.01794 | 0.02526 | 0.00118 | −0.00494 | −0.02075 |

Table 9 indicates the third-order aberration coefficients of Example 6 upon focused on an object distance of 0.5 m by this focusing method.

Table 7 sets forth the third-order aberration coefficients of Example 6 upon focused on an object at infinity. In this state sufficient aberration correction is achieved, but from those shown in Table 8 it is found that upon focused at an object distance of 0.5 m by moving the entire system some considerable aberration variations, especially off-axis ones occur. In particular, the variations of the coma and distortion coefficients are found to be beyond a permissible range defined by the depth of focus. The effect of this focusing method is then shown in Table 9.

In this example, the lens system is focused at 0.5 m by moving the entire system while the spacing between the first and second lens groups is increased to 0.206 mm and the spacing between the second and third lens groups is increased to 0.191 mm. It is clearly found that the variation of the coma and distortion coefficients due to focusing is much more reduced. This teaches that by making the above-mentioned spacings between the respective lens groups variable, it is possible to determine a spacing that enables the variation of off-axis aberrations or coma and distortion to be reduced without producing any great influence on the variation of longitudinal spherical aberration.

Next, reference will be made to what effect is obtained by making the spacings between the respective lens groups movable and, at the same time, varying the spacing between the sub-groups obtained by the division of a certain lens group. Referring here to Example 10 to be described later, a first lens group G1 consists of two negative lenses and a positive lens, as seen from FIG. 8 or a sectional schematic thereof. This lens group is divided, in order from an object side, into a negative component consisting of two negative lenses followed by a positive lens component, so that floating can be achieved upon focused at a finite object distance. In this example, two spacings, i.e., the internal movable spacing of the first lens group G1 and the spacing between the first and second lens groups G1 and G2 are used for aberration variation compensation.

TABLE 10

|  | $SA_3$ | $CM_3$ | $AS_3$ | $DT_3$ | $PT_3$ |
|---|---|---|---|---|---|
| 1st group | 0.58988 | −1.89275 | 0.73841 | −3.47627 | 0.56097 |
| 2nd group | −0.46707 | 0.77036 | −0.12031 | 1.69430 | −0.41125 |
| 3rd group | −0.17210 | 1.06950 | −0.45978 | 1.52172 | −0.21182 |
| Σ | −0.049290 | −0.05289 | 0.15832 | −0.26026 | −0.06209 |

TABLE 11

|  | $SA_3$ | $CM_3$ | $AS_3$ | $DT_3$ | $PT_3$ |
|---|---|---|---|---|---|
| 1st group | 0.54958 | −1.67472 | 0.59349 | −2.79969 | 0.49709 |
| 2nd group | −0.44993 | 0.70471 | −0.08339 | 1.37570 | −0.36442 |
| 3rd group | −0.15462 | 0.99013 | −0.38877 | 1.35672 | −0.18769 |
| Σ | −0.05497 | 0.02011 | 0.12133 | −0.06727 | −0.05502 |

$SA_3$: the third-order spherical aberration coefficient;
$CM_3$: the third-order coma coefficient;
$AS_3$: the third-order astigmatism coefficient;
$DT_3$: the third-order distortion coefficient;
$PT_3$: the third-order curvature-of-field coefficient; and
Σ: the sum total of the aberration coefficients throughout the system.

Table 10 indicates the third-order aberration coefficients of Example 10 per lens group upon focused on an object at infinity, and Table 11 sets forth the third-order aberration coefficients of Example 10 upon focused at an object distance of 0.5 m by the movement of the entire system.

TABLE 12

|  | $SA_3$ | $CM_3$ | $AS_3$ | $DT_3$ | $PT_3$ |
|---|---|---|---|---|---|
| 1st group | 0.55030 | −1.69712 | 0.60769 | −2.79222 | 0.49131 |
| 2nd group | −0.44618 | 0.72406 | −0.09005 | 1.36453 | −0.36018 |
| 3rd group | −0.15278 | 0.98189 | −0.38256 | 1.34186 | −0.18551 |
| Σ | −0.04867 | 0.00883 | 0.13508 | −0.08582 | −0.05438 |

Table 12 indicates the third-order aberration correction coefficients of Example 10 upon focused at an object distance of 0.5 m by the present floating focusing method.

In this example, too, the variation of various aberration coefficients, especially coma and distortion, upon focused on an object at infinity by the movement of the entire system is large as can be seen from Table 11. With the floating method wherein the spacing between the first and second lens groups is varied, however, it is possible to obtain stable performance as can be seen from Table 12. In this example, the change of the internal spacing of the first lens group is decreased to 0.137 mm whereas the spacing between the first and second lens groups is increased to 0.282 mm.

In what follows, the wide-angle lens system according to the present invention will be explained more illustratively with reference to Examples 1 through 10.

Example 1 is directed to a wide-angle lens system having a focal length of 28.25 mm and an aperture ratio of 1:2.85, and is shown in section in FIG. 1. A first lens group G1 consists of one negative meniscus lens convex on an object side. A second lens group G2 is divided into front and rear sub-groups $G_{21}$ and $G_{22}$ between which an aperture stop is located, said $G_{21}$ made up of a negative meniscus lens convex on the object side and a doublet consisting of a double convex lens and a double concave lens while said $G_{22}$ made up of a triplet consisting of a double concave lens, a double convex lens and a negative meniscus lens convex on an image side. A third lens group G3 consists of one negative meniscus lens convex on the image side.

An aspherical surface is used for the surface of the second lens group G2 proximate to the object side. This aspherical surface increases in aspheric quantity at the convex surface with the refracting power diminishing to the vicinity of the zonal region, so that spherical aberration likely to suffer from undercorrection can be easily corrected. Another aspherical surface is used for the concave surface of the negative meniscus lens forming the third lens group G3, and plays a role in making a peripheral image surface flat. The aspherical surface is of small aspheric quantity, but is such that the refracting power increases farther and farther off the optical axis.

Focusing on a finite object point is carried out by the movement of the second lens group G2, as shown in FIG. 1. This focusing is a so-called inner focusing method wherein the entire length of the system remains constant.

FIGS. 9(*a*) to 9(*d*) are aberration diagrams of Example 1 upon focused on an object point at infinity, and FIGS. 9(*e*) to 9(*h*) aberration diagrams of Example 1 upon focused on a finite object point 0.5 m away from the first lens surface. In these aberration diagrams (a) and (e) stands for spherical aberration; (b) and (f) astigmatism; (c) and (g) chromatic aberration of magnification; and (d) and (h) distortion. The results teach that stable performance can be obtained by the present focusing method.

Figure 2:
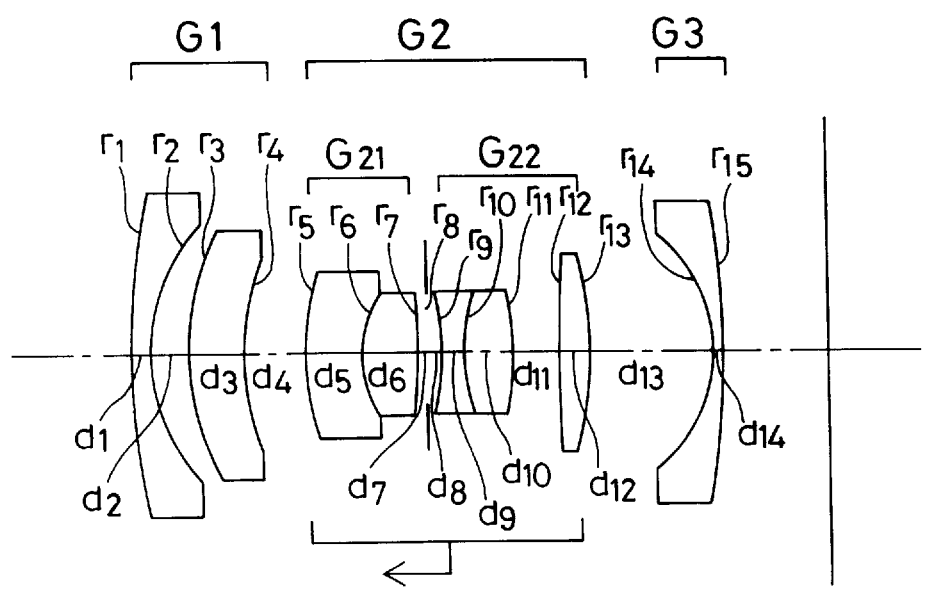
FIG. 2 is a sectional schematic of Example 2 of the wide-angle lens system according to the present invention.

Example 2 is directed to a wide-angle lens system having a focal length of 28.25 mm and an aperture ratio of 1:2.83. Example 2 bears resemblance in specifications to Example 1, but differs therefrom in terms of lens layout; so a first lens group G1 consists of two lenses and a second lens group G2 includes a positive single lens in the rear. As shown in section in FIG. 2, the first lens group G1 consists of two lenses, i.e., a negative meniscus lens convex on an object side and a positive meniscus lens convex on the object side, and the second lens group G2 is divided into front and rear sub-groups $G_{21}$ and $G_{22}$ between which an aperture stop is located, said $G_{21}$ made up of a doublet consisting of a negative meniscus lens convex on the object side and a double convex lens and said $G_{22}$ made up of a doublet consisting of a double concave lens and a double convex lens, and a double convex lens with the image side-facing surface having a strong curvature. A third lens group G3 consists of one negative meniscus lens convex on an image side.

An aspherical surface is used for the final concave surface of the first lens group G1. This aspherical surface increases in refracting power farther and farther off the optical axis; so it makes a contribution to correction of off-axis aberrations, for instance, delicate balance of sagittal coma. Another aspherical surface is used for the front concave surface of the third lens group G3. Since this aspherical surface increases in refracting power farther and farther off the optical axis, it makes a contribution to improvements in flatness of field. Aspheric quantity is relatively as large as 287 μm in the vicinity of the effective aperture, meaning that the aspherical surface has a great effect on a peripheral image surface.

FIG. 10 is aberration diagrams of Example 2 similar to those of FIG. 9. In this example, too, focusing is achieved by the inner focusing method involving the movement of the second lens group G2. It is thus possible to obtain an optical system substantially free from aberrations. During focusing from an object point at infinity on a finite object point, the spacing between the doublet and the positive lens forming the rear sub-group $G_{22}$ of the second lens group G2 is increased for floating purposes.

Example 3 is directed to a wide-angle lens system having a focal length of 28.25 mm and an aperture ratio of 1:2.88. Example 3 is similar to Example 1 in terms of lens layout and use of aspherical surfaces, and so is not illustrated. In this example, first and third lens groups G1 and G3 are located with respect to a second lens group G2 with some allowance. Focusing is carried out by the movement of the second lens group G2. FIG. 11 is aberration diagrams of Example 3 similar those of FIG. 9.

Example 4 is directed to a wide-angle lens system having a focal length of 28.25 mm and an aperture ratio of 1:2.82. Example 3 is similar to Example 2 in terms of lens arrangement and use of aspherical surfaces, and so is not illustrated. Focusing is carried out by the movement of the second lens group G2. FIG. 12 is aberration diagrams of Example 3 similar those of FIG. 9.

Figure 3:
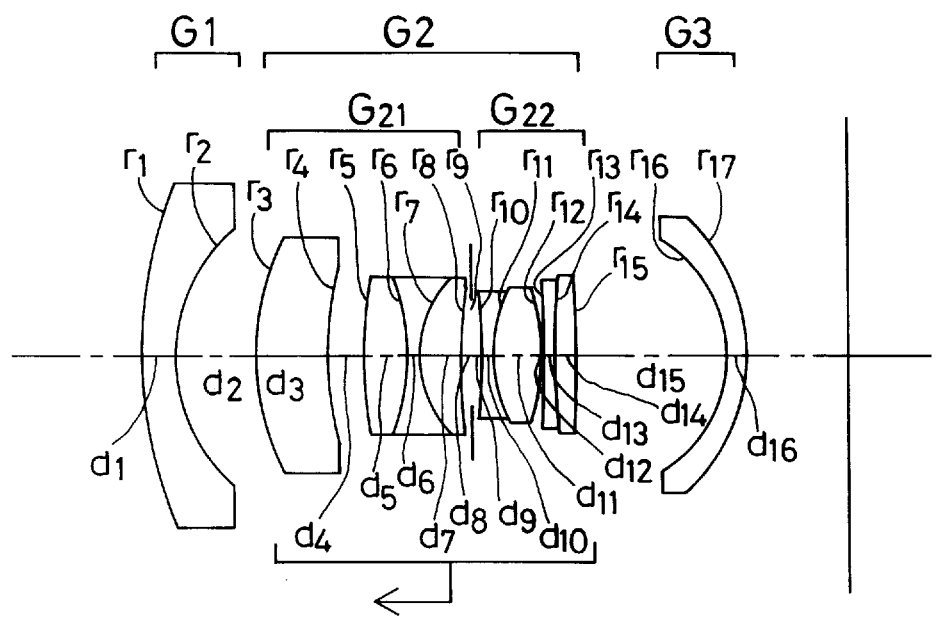
FIG. 3 is a sectional schematic of Example 5 of the wide-angle lens system according to the present invention.

Example 5 is directed to a wide-angle lens system having a focal length of 28.25 mm and an aperture ratio of 1:2.82, and is shown in section in FIG. 3. It is to be noted that a second group G2 is of complicated construction. A first lens group G1 consists of one negative meniscus lens convex on an object side, and the second lens group G2 is divided into front and rear sub-groups $G_{21}$ and $G_{22}$ between which a aperture stop is located, said $G_{21}$ made up of a thick positive meniscus lens convex on the object side and a triplet consisting of a double convex lens, a double concave lens of strong curvature and a negative meniscus lens convex on the object side, and said $G_{22}$ made up of a doublet consisting of a double concave lens and a double convex lens and a doublet consisting of a double concave lens and a double convex lens and a doublet consisting of a double concave lens of small refracting power and a double convex lens. A third lens group G3 consists of one negative meniscus lens of strong curvature, which is convex on an image side.

An aspherical surface is used for the rear surface of the negative meniscus lens forming the first lens group G1, and is designed such that the refracting power increases farther and farther off the optical axis. This enables sagittal coma to be more easily corrected. Another aspherical surface is used for the surface, proximate to the object side, of the triplet forming part of the front sub-group $G_{21}$ of the second lens group G2, and is shaped such that the convergent refracting power diminishes farther and farther off the optical axis, thus enabling spherical aberration to be easily corrected. It has thus been now found that a desired wide-angle lens system having a large aperture ratio can be achieved.

In this example, focusing is carried out by the movement of the second lens group G2. FIG. 13 is aberration diagrams of Example 5 similar to those of FIG. 9. Little if any distortion is found upon focused on an object point at infinity, but some changes are observed upon focused on a finite object point. This can be solved by a partial floating method, etc. For this purpose, it is effective to ensure a correction space within the second lens group G2.

Figure 4:
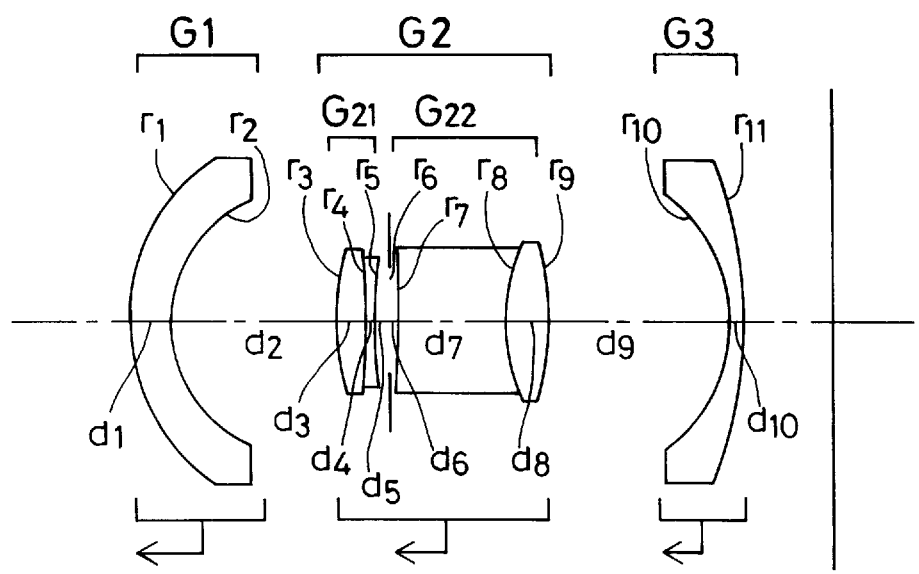
FIG. 4 is a sectional schematic of Example 6 of the wide-angle lens system according to the present invention.

Example 6 is directed to a wide-angle lens system having a focal length of 28.20 mm and an aperture ratio of 1:2.88, and is shown in section in FIG. 4. As illustrated, this example is of simple lens construction. In other words, a first lens group G1 consists of one negative meniscus lens convex on an object side, and a second lens group G2 is divided into front and rear sub-groups $G_{21}$ and $G_{22}$ between which an aperture stop is located, said $G_{21}$ made up of a doublet consisting of a double convex lens and a double concave lens and said $G_{22}$ made up of a doublet consisting of a double concave lens with a concave surface of strong curvature facing an image side and a double convex lens. A third lens group G3 consists of one negative meniscus lens convex on the image side.

An aspherical surface is used for the surface, proximate to the image side, of the rear sub-group $G_{22}$ of the second lens group. This aspherical surface is shaped such that the convergence of refracting power diminishes farther and farther off the optical axis, thus making a contribution to correction of flatness of field. An aspheric quantity of about 56 μm is obtained in the vicinity of the effective aperture.

FIG. 14 is aberration diagrams of Example 6 similar to those of FIG. 9. For focusing from an object point at infinity on a finite object point, the entire system is extended out while the spacings between the first and second lens groups G1 and G2, and the second and third lens groups G2 and G3 are varied, whereby aberration variations due to focusing are reduced or limited. When focusing is done on a finite object point 0.5 m away from the first lens surface, a floating quantity increase of +0.206 mm is obtained for the spacing between the first and second lens groups G1 and G2, and +0.191 mm for the spacing between the second and third lens groups G2 and G3, where the effect of the invention is achievable.

Figure 5:
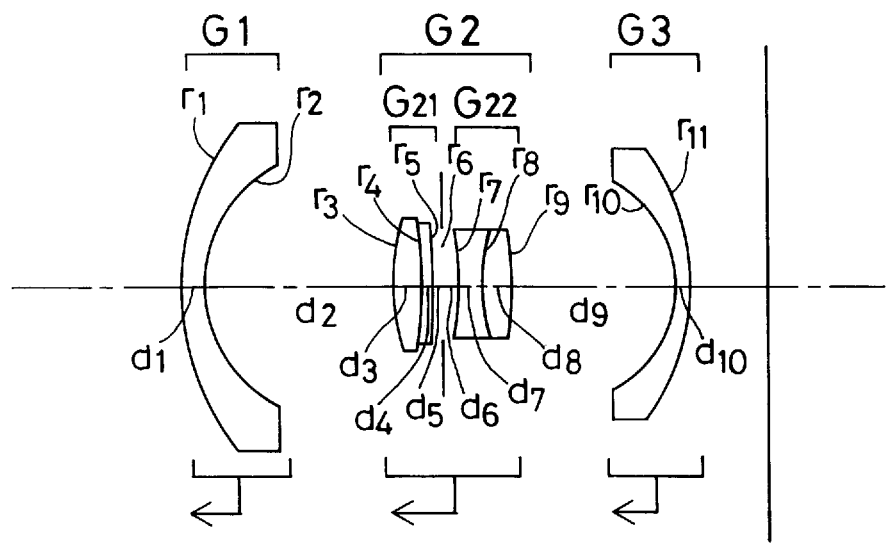
FIG. 5 is a sectional schematic of Example 7 of the wide-angle lens system according to the present invention.

Example 7 is directed to a wide-angle lens system having a focal length of 21.15 mm and an aperture ratio as large as 1:2.85, and is shown in section in FIG. 5. A first lens group G1 consists of one negative meniscus lens convex on an object side, and a second lens group G2 is divided into front and rear sub-groups $G_{21}$ and $G_{22}$ with an aperture stop located therebetween, said $G_{21}$ made up of a doublet consisting of a double convex lens and a negative meniscus lens convex on an image side, and said $G_{22}$ made up of a doublet consisting of a double concave lens and a double convex lens. A third lens group G3 consists of one negative meniscus lens convex on the image side.

Three aspherical surfaces are used, one for the first surface of the first lens group G1 that faces the object side, one for the final surface of the second lens group G2, and one for the image side-facing surface or final surface of the third lens group G3. The aspherical surface used for the convex surface of the negative meniscus lens forming the first lens group G1 is shaped such that the aspheric quantity decreases sharply farther and farther off the optical axis, thus acting effectively on correction of sagittal coma or the like. The aspherical surface used for the final surface of the second lens group G2 acts effectively on correction of coma, and astigmatism. The aspherical surface used for the convex surface of the negative meniscus lens of the third lens group G3 serves to diminish the refracting power of a peripheral surface of the lens, and so acts effectively on improving flatness of field. Then, an aspheric quantity of 1,013 μm is obtained in the vicinity of the effective aperture.

FIG. 15 is aberration diagrams of Example 7 similar to those of FIG. 9. For focusing from an object point at infinity on a finite object point, the entire system is extended out while the spacings between the first and second lens groups G1 and G2, and the second and third lens groups G2 and G3 are varied, whereby aberration variations due to focusing are reduced or limited. When focusing is done from an object at infinity on a finite object 0.5 m away from the first lens surface, a floating quantity increase of −0.077 mm is obtained for the spacing between the first and second lens groups G1 and G2, and +0.154 mm for the spacing between the second and third lens groups G2 and G3.

Figure 6:
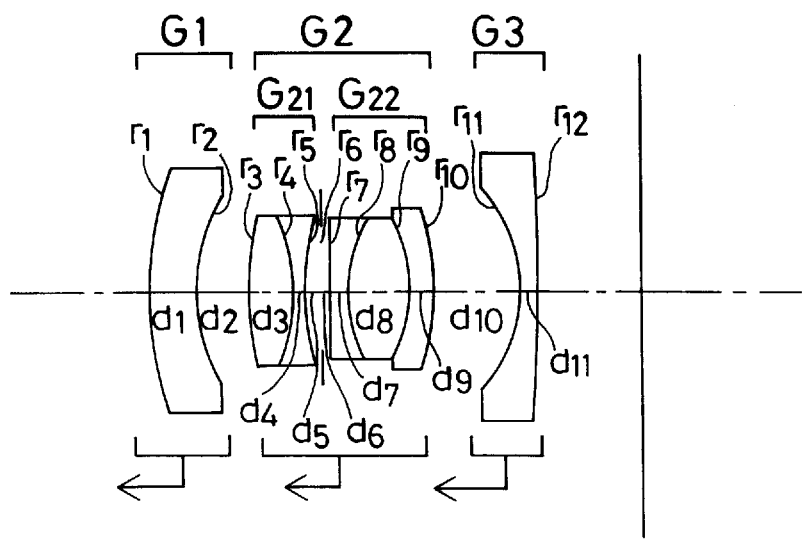
FIG. 6 is a sectional schematic of Example 8 of the wide-angle lens system according to the present invention.

Example 8 is directed to a wide-angle lens system having a focal length of 28.25 mm and an aperture ratio as large as 1:2.08, and is shown in section in FIG. 6. A first lens group G1 consists of one negative meniscus lens convex on an object side, and a second lens group G2 is divided into front and rear sub-groups $G_{21}$ and $G_{22}$, between which an aperture stop is located, said $G_{21}$ made up of a doublet consisting of a double convex lens and a double concave lens and said $G_{22}$ made up of a triplet consisting of a negative meniscus lens convex on the object side, a double convex lens and a negative meniscus lens convex on an image side. A third lens group G3 consists of one negative meniscus lens convex on the image side. Two aspherical surfaces are used, one for the first surface of the first lens group G1 that faces the object side and one for the concave surface of the third lens group G3.

FIG. 16 is aberration diagrams of Example 8 similar to those of FIG. 9. For focusing from an object point at infinity on a finite object point, the entire system is extended out while the spacings between the first and second lens groups G1 and G2, and the second and third lens groups G2 and G3 are varied, whereby aberration variations due to focusing are reduced or limited. When focusing is effected from an object at infinity on a finite object 0.5 m away from the first lens surface, a floating quantity increase of +0.282 mm is obtained for the spacing between the first and second lens groups G1 and G2, and −0.301 mm for the spacing between the second and third lens groups G2 and G3.

Figure 7:
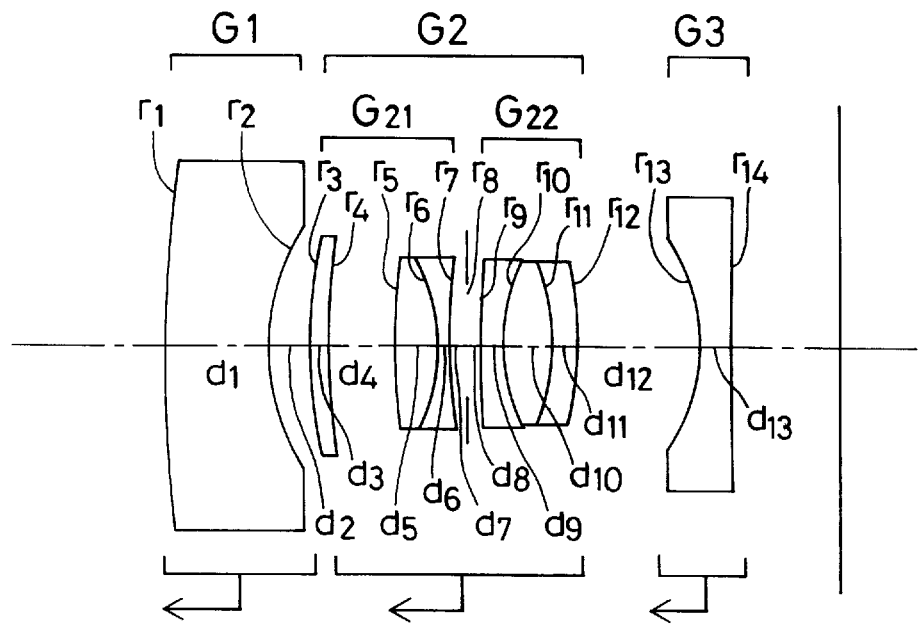
FIG. 7 is a sectional schematic of Example 9 of the wide-angle lens system according to the present invention.

Example 9 is directed to a wide-angle lens system having a focal length of 28.25 mm and an aperture ratio as large as 1:2.08, and is shown in section in FIG. 7. A first lens group G1 consists of one thick negative meniscus lens convex on an object side, and a second lens group G2 is divided into front and rear sub-groups $G_{21}$ and $G_{22}$ with an aperture stop interposed between them, said $G_{21}$ made up of a positive meniscus lens convex on the object side and a doublet consisting of a double convex lens and a double concave lens and said $G_{22}$ made up of a triplet consisting of a negative meniscus lens convex on the object side, a double convex lens and a negative meniscus lens convex on an image side. A third lens group G3 consists of one negative meniscus lens convex on the image side.

An aspherical surface is used for the convex surface of the second lens group G2 that is proximate to the object side, and is shaped such that the refracting power diminishes farther and farther off the optical axis, thus acting effectively on correction of coma and spherical aberration. In particular, this action becomes strong in the case of an optical system having a large aperture ratio. An aspheric quantity as large as 951 μm is obtained in the vicinity of the effective aperture. Another aspherical surface is used for the concave surface of the third lens group G3 for the purpose of correcting flatness of field. To maintain vignetting factor at a large aperture ratio, it is required to make a bundle of marginal rays large and hence obtain an aspheric quantity of 128 μm in the vicinity of the effective aperture.

FIG. 17 is aberration diagrams of Example 9 similar to those of FIG. 9, and from this it is found that there is little if any aberration variation. For focusing from an object point at infinity on a finite object point, the entire system is extended out while the spacings between the first and second lens groups G1 and G2, and the second and third lens groups G2 and G3 are varied, whereby aberration variations due to focusing are reduced or limited. When focusing is effected from an object at infinity on a finite object 0.5 m away from the first lens surface, a floating quantity increase of +1.261 mm is obtained for the spacing between the first and second lens groups G1 and G2, and −0.733 mm for the spacing between the second and third lens groups G2 and G3.

Example 10 is directed to a wide-angle lens system having a focal length of 28.24 mm and an aperture ratio as large as 1:2.08, and is shown in section in FIG. 8. A first lens group G1 consists of two negative meniscus lenses convex on an object side, an air lens and a positive meniscus lens having strong curvature on the object side, which is located behind the air lens. A second lens group G2 is divided into front and rear sub-groups $G_{21}$ and $G_{22}$ between which an aperture stop is interposed, said $G_{21}$ made up of a doublet consisting of a negative meniscus lens convex on the object side and a positive meniscus lens and said $G_{22}$ made up of a doublet consisting of a double concave lens and a double convex lens and a double convex lens. The third lens group G3 consists of one negative meniscus lens convex on an image side.

An aspherical surface is used for the concave surface of the first meniscus lens of the first lens group G1, and is shaped such that the dispersive refracting power increases farther and farther off the optical axis, thus producing a great action on correction of sagittal coma likely to remain with respect to a peripheral image surface. This aspherical surface is effective for distortion correction as well. Another aspherical surface is used for the surface of the second lens group G2 that is proximate to the object side, and produces a great action on spherical aberration correction. This is important for achieving an optical system having a large aperture ration. Still another aspherical surface is used for the concave surface of the negative meniscus lens of the third lens group G3 to improve the off-axis flatness of field.

FIG. 18 is aberration diagrams of Example 10 similar to those of FIG. 9, and from this it is found that there is little if any aberration variation. For focusing from an object point at infinity on a finite object point, the entire system is extended out while the spacing between the two negative lenses and the subsequent positive lens forming the first lens group G1 and the spacing between the first and second lens groups G1 and G2 are varied, whereby aberration variations due to focusing are reduced or limited. When focusing is effected from an object at infinity to a finite object 0.5 m away from the first lens surface, a floating quantity increase of −0.137 mm is obtained for the spacing between the two negative lenses and the subsequent positive lens forming the first lens group G1, and +0.282 mm for the spacing between the first and second lens groups G1 and G2.

Throughout the examples meridional and sagittal coma aberrations are well corrected. In this regard, the wide-angle lens systems according to this invention are much more improved over a conventional lens system made large by use of spherical surfaces alone or a conventional inverted telephoto type.

Set out below are numerical data concerning the above-mentioned examples. Symbols used hereinafter but not hereinbefore have the following meanings:

f: the focal length of the entire system;

$F_{NO}$: the F-number;

ω: the half angle of field;

$r_1, r_2, \ldots$ : the radii of curvature of the respective lens surfaces;

$d_1, d_2, \ldots$ : the spacings between the respective lens surfaces;

$n_{d1}, n_{d2}, \ldots$ : the d-line refractive indices of the respective lenses; and $V_{d1}, V_{d2}, \ldots$ : the Abbe's number of the respective lenses.

Here let x denote a positive direction of propagation of light and y a direction perpendicular to the optical axis. Then, aspherical shape is given by $$x=(y^2/r)/[1+\{1-P(y/r)^2\}^{1/2}]+A_4y^4+A_6y^6+A_8y^8+A_{10}y^{10}$$

where r is the paraxial radius of curvature; P is the conical coefficient, and $A_4$, $A_6$, $A_8$ and $A_{10}$ are the fourth, sixth, eighth, and tenth aspherical coefficients, respectively.

Example 1 f = 28.25, $F_{NO}$ = 2.85, ω = 37.55°

| | | | | | | | | |
|---|---|---|---|---|---|---|---|---|
| $r_1$ = | 45.7477 | | $d_1$ = | 2.000 | $n_{d1}$ = 1.52249 | $v_{d1}$ = 59.79 |
| $r_2$ = | 20.2273 | | $d_2$ = | 13.505 | | |
| $r_3$ = | 31.8802 | (Aspheric) | $d_3$ = | 2.200 | $n_{d2}$ = 1.77250 | $v_{d2}$ = 49.60 |
| $r_4$ = | 17.3560 | | $d_4$ = | 0.626 | | |
| $r_5$ = | 17.9470 | | $d_5$ = | 5.000 | $n_{d3}$ = 1.77250 | $v_{d3}$ = 49.60 |
| $r_6$ = | −18.0589 | | $d_6$ = | 0.850 | $n_{d4}$ = 1.58267 | $v_{d4}$ = 46.33 |
| $r_7$ = | 61.2202 | | $d_7$ = | 3.461 | | |
| $r_8$ = | ∞ (Stop) | | $d_8$ = | 3.460 | | |
| $r_9$ = | −175.6281 | | $d_9$ = | 2.000 | $nd_5$ = 1.623645 | $v_{d5}$ = 36.54 |
| $r_{10}$ = | 30.8634 | | $d_{10}$ = | 5.362 | $n_{d6}$ = 1.74400 | $v_{d6}$ = 44.79 |
| $r_{11}$ = | −10.2656 | | $d_{11}$ = | 2.749 | $n_{d7}$ = 1.80518 | $v_{d7}$ = 25.48 |
| $r_{12}$ = | −21.9822 | | $d_{12}$ = | 12.771 | | |
| $r_{13}$ = | −12.5639 | (Aspheric) | $d_{13}$ = | 1.650 | $n_{d8}$ = 1.48749 | $v_{d8}$ = 70.21 |
| $r_{14}$ = | −28.6432 | | | | | |

Aspherical Coefficients

3rd surface

P = 1.0000
$A_4$ = −0.20326 × 10$^{-4}$
$A_6$ = −0.97541 × 10$^{-7}$
$A_8$ = 0.18268 × 10$^{-9}$
$A_{10}$ = −0.19504 × 10$^{-11}$

13th surface

P = 1.0208
$A_4$ = −0.53251 × 10$^{-4}$

-continued $A_6 = 0.10680 \times 10^{-5}$
$A_8 = -0.10632 \times 10^{-7}$
$A_{10} = 0.48187 \times 10^{-10}$ Focusing or Floating Spaces

| OBJ | ∞ | −500 |
|---|---|---|
| $d_2$ | 13.505 | 12.342 |
| $d_{12}$ | 12.771 | 13.933 |

Example 2

$f = 28.25, F_{NO} = 2.83, \omega = 37.66°$

| | | | | | | | |
|---|---|---|---|---|---|---|---|
| $r_1 =$ | 71.8061 | | $d_1 =$ | 1.850 | $n_{d1} = 1.48749$ | $v_{d1} = 70.21$ |
| $r_2 =$ | 16.8902 | | $d_2 =$ | 3.578 | | |
| $r_3 =$ | 24.6507 | | $d_3 =$ | 5.296 | $n_{d2} = 1.84666$ | $v_{d2} = 23.88$ |
| $r_4 =$ | 25.6113 | (Aspheric) | $d_4 =$ | 5.443 | | |
| $r_5 =$ | 20.1463 | | $d_5 =$ | 5.645 | $n_{d3} = 1.80518$ | $v_{d3} = 25.43$ |
| $r_6 =$ | 9.7186 | | $d_6 =$ | 5.253 | $n_{d4} = 1.56965$ | $v_{d4} = 49.33$ |
| $r_7 =$ | −48.8544 | | $d_7 =$ | 0.515 | | |
| $r_8 =$ | ∞ (Stop) | | $d_8 =$ | 1.714 | | |
| $r_9 =$ | −19.9631 | | $d_9 =$ | 2.200 | $n_{d5} = 1.60323$ | $v_{d5} = 42.32$ |
| $r_{10} =$ | 18.6011 | | $d_{10} =$ | 4.544 | $n_{d6} = 1.77250$ | $v_{d6} = 49.60$ |
| $r_{11} =$ | −24.3183 | | $d_{11} =$ | 4.349 | | |
| $r_{12} =$ | 261.7147 | | $d_{12} =$ | 2.898 | $n_{d7} = 1.69680$ | $v_{d7} = 55.53$ |
| $r_{13} =$ | −34.6477 | | $d_{13} =$ | 11.664 | | |
| $r_{14} =$ | −13.5483 | (Aspheric) | $d_{14} =$ | 0.900 | $n_{d8} = 1.48749$ | $v_{d8} = 70.21$ |
| $r_{15} =$ | −70.3472 | | | | | |

Aspherical Coefficients

4th surface $P = 1.0000$
$A_4 = 0.35387 \times 10^{-5}$
$A_6 = 0.15947 \times 10^{-7}$
$A_8 = 0.13970 \times 10^{-10}$
$A_{10} = -0.20336 \times 10^{-12}$ 14th surface $P = 1.0818$
$A_4 = -0.41008 \times 10^{-4}$
$A_6 = 0.61779 \times 10^{-6}$
$A_8 = -0.57324 \times 10^{-8}$
$A_{10} = 0.22400 \times 10^{-10}$ Focusing or Floating Spaces

| OBJ | ∞ | −514 |
|---|---|---|
| $d_4$ | 5.443 | 3.710 |
| $d_{11}$ | 4.349 | 4.984 |
| $d_{13}$ | 11.664 | 12.764 |

Example 3

$f = 28.25, F_{NO} = 2.88, \omega = 37.546°$

| | | | | | | | |
|---|---|---|---|---|---|---|---|
| $r_1 =$ | 50.5055 | | $d_1 =$ | 2.000 | $n_{d1} = 1.52249$ | $v_{d1} = 59.79$ |
| $r_2 =$ | 19.9011 | | $d_2 =$ | 13.269 | | |
| $r_3 =$ | 29.1262 | (Aspheric) | $d_3 =$ | 2.500 | $n_{d2} = 1.77250$ | $v_{d2} = 49.60$ |
| $r_4 =$ | 19.5699 | | $d_4 =$ | 0.699 | | |
| $r_5 =$ | 20.9244 | | $d_5 =$ | 5.818 | $n_{d3} = 1.77250$ | $v_{d3} = 49.60$ |
| $r_6 =$ | −17.4414 | | $d_6 =$ | 0.830 | $n_{d4} = 1.58267$ | $v_{d4} = 46.33$ |
| $r_7 =$ | 69.1493 | | $d_7 =$ | 2.950 | | |
| $r_8 =$ | ∞ (Stop) | | $d_8 =$ | 2.932 | | |
| $r_9 =$ | −109.8322 | | $d_9 =$ | 2.000 | $n_{d5} = 1.62364$ | $v_{d5} = 36.54$ |
| $r_{10} =$ | 32.7720 | | $d_{10} =$ | 5.945 | $n_{d6} = 1.74400$ | $v_{d6} = 44.79$ |
| $r_{11} =$ | −10.2665 | | $d_{11} =$ | 2.700 | $n_{d7} = 1.80518$ | $v_{d7} = 25.43$ |
| $r_{12} =$ | −21.9703 | | $d_{12} =$ | 13.056 | | |
| $r_{13} =$ | −12.6035 | (Aspheric) | $d_{13} =$ | 1.650 | $n_{d8} = 1.48749$ | $v_{d8} = 70.21$ |
| $r_{14} =$ | −27.3282 | | | | | |

Aspherical Coefficients

3rd surface $P = 1.0000$

-continued $A_4 = -0.18662 \times 10^{-4}$
$A_6 = -0.90746 \times 10^{-7}$
$A_8 = 0.42961 \times 10^{-10}$
$A_{10} = -0.13627 \times 10^{-11}$ 13th surface $P = 1.0209$
$A_4 = -0.52090 \times 10^{-4}$
$A_6 = 0.10416 \times 10^{-5}$
$A_8 = -0.10340 \times 10^{-7}$
$A_{10} = 0.45398 \times 10^{-10}$ Focusing or Floating Spaces

| OBJ | ∞ | −500 |
|---|---|---|
| $d_2$ | 13.269 | 12.045 |
| $d_{12}$ | 13.056 | 14.280 |

Example 4

$f = 28.25, F_{NO} = 2.82, \omega = 37.277°$

| | | | | | | | |
|---|---|---|---|---|---|---|---|
| $r_1 =$ | 82.6312 | | $d_1 =$ | 2.330 | $n_{d1} = 1.48749$ | $\nu_{d1} = 70.21$ |
| $r_2 =$ | 16.2594 | | $d_2 =$ | 3.431 | | |
| $r_3 =$ | 22.6416 | | $d_3 =$ | 4.835 | $n_{d2} = 1.84666$ | $\nu_{d2} = 23.88$ |
| $r_4 =$ | 22.0253 | (Aspheric) | $d_4 =$ | 5.079 | | |
| $r_5 =$ | 17.8591 | | $d_5 =$ | 6.032 | $n_{d3} = 1.80518$ | $\nu_{d3} = 25.43$ |
| $r_6 =$ | 8.9980 | | $d_6 =$ | 3.916 | $n_{d4} = 1.56965$ | $\nu_{d4} = 49.33$ |
| $r_7 =$ | −48.7978 | | $d_7 =$ | 0.834 | | |
| $r_8 =$ | ∞ (Stop) | | $d_8 =$ | 1.735 | | |
| $r_9 =$ | −18.0589 | | $d_9 =$ | 2.655 | $n_{d5} = 1.58215$ | $\nu_{d5} = 42.09$ |
| $r_{10} =$ | 18.7548 | | $d_{10} =$ | 4.472 | $n_{d6} = 1.77250$ | $\nu_{d6} = 49.60$ |
| $r_{11} =$ | −22.6718 | | $d_{11} =$ | 5.483 | | |
| $r_{12} =$ | 585.5052 | | $d_{12} =$ | 2.502 | $n_{d7} = 1.74100$ | $\nu_{d7} = 52.65$ |
| $r_{13} =$ | −42.0410 | | $d_{13} =$ | 11.595 | | |
| $r_{14} =$ | −13.3155 | (Aspheric) | $d_{14} =$ | 0.950 | $n_{d8} = 1.48749$ | $\nu_{d8} = 70.21$ |
| $r_{15} =$ | −37.0931 | | | | | |

Aspherical Coefficients

4th surface $P = 1.0000$
$A_4 = 0.78002 \times 10^{-6}$
$A_6 = -0.17613 \times 10^{-7}$
$A_8 = 0.17098 \times 10^{-9}$
$A_{10} = -0.14588 \times 10^{-11}$ 14th surface $P = 1.0561$
$A_4 = -0.50025 \times 10^{-4}$
$A_6 = 0.80207 \times 10^{-6}$
$A_8 = -0.71319 \times 10^{-8}$
$A_{10} = 0.24072 \times 10^{-10}$ Focusing or Floating Spaces

| OBJ | ∞ | −500 |
|---|---|---|
| $d_4$ | 5.079 | 3.542 |
| $d_{13}$ | 11.595 | 13.133 |

Example 5

$f = 28.25, F_{NO} = 2.82, \omega = 37.503°$

| | | | | | | | |
|---|---|---|---|---|---|---|---|
| $r_1 =$ | 41.3997 | | $d_1 =$ | 3.200 | $n_{d1} = 1.61700$ | $\nu_{d1} = 62.80$ |
| $r_2 =$ | 14.7518 | (Aspheric) | $d_2 =$ | 7.344 | | |
| $r_3 =$ | 21.6666 | | $d_3 =$ | 7.110 | $n_{d2} = 1.66680$ | $\nu_{d2} = 33.04$ |
| $r_4 =$ | 35.1779 | | $d_4 =$ | 3.117 | | |
| $r_5 =$ | 40.7851 | (Aspheric) | $d_5 =$ | 4.192 | $n_{d3} = 1.79500$ | $\nu_{d3} = 45.29$ |
| $r_6 =$ | −18.7082 | | $d_6 =$ | 1.200 | $n_{d4} = 1.62045$ | $\nu_{d4} = 38.12$ |
| $r_7 =$ | 10.2699 | | $d_7 =$ | 3.974 | $n_{d5} = 1.49700$ | $\nu_{d5} = 81.61$ |
| $r_8 =$ | 62.8082 | | $d_8 =$ | 0.808 | | |
| $r_9 =$ | ∞ (Stop) | | $d_9 =$ | 0.583 | | |
| $r_{10} =$ | −212.1168 | | $d_{10} =$ | 1.500 | $n_{d6} = 1.58313$ | $\nu_{d6} = 59.38$ |
| $r_{11} =$ | 14.3300 | | $d_{11} =$ | 4.556 | $n_{d7} = 1.74100$ | $\nu_{d7} = 52.65$ |
| $r_{12} =$ | −19.3044 | | $d_{12} =$ | 0.150 | | |
| $r_{13} =$ | −67.0967 | | $d_{13} =$ | 1.000 | $n_{d8} = 1.67270$ | $\nu_{d8} = 32.10$ |

-continued

| | | | | | | | |
|---|---|---|---|---|---|---|---|
| $r_{14} =$ | 52.4027 | | $d_{14} =$ | 1.982 | $n_{d9} = 1.77250$ | | $\nu_{d9} = 49.60$ |
| $r_{15} =$ | −304.9685 | | $d_{15} =$ | 14.384 | | | |
| $r_{16} =$ | −11.5442 | | $d_{16} =$ | 1.200 | $n_{d10} = 1.65830$ | | $\nu_{d10} = 57.33$ |
| $r_{17} =$ | −18.3544 | | | | | | |

Aspherical Coefficients

2nd surface $P = 1.0000$
$A_4 = 0.32710 \times 10^{-5}$
$A_6 = -0.48022 \times 10^{-7}$
$A_8 = 0.40963 \times 10^{-9}$
$A_{10} = -0.12681 \times 10^{-11}$ 5th surface $P = 1.0000$
$A_4 = -0.32015 \times 10^{-4}$
$A_6 = -0.16426 \times 10^{-6}$
$A_8 = 0.56575 \times 10^{-9}$
$A_{10} = -0.52037 \times 10^{-11}$ Focusing or Floating Spaces

| OBJ | ∞ | −500 |
|---|---|---|
| $d_2$ | 7.344 | 5.520 |
| $d_{15}$ | 14.384 | 16.209 |

Example 6

$f = 28.2, F_{NO} = 2.88, \omega = 37.462°$

| | | | | | | |
|---|---|---|---|---|---|---|
| $r_1 =$ | 18.5447 | | $d_1 =$ | 3.693 | $n_{d1} = 1.67790$ | $\nu_{d1} = 55.33$ |
| $r_2 =$ | 11.9475 | | $d_2 =$ | 15.687 | | |
| $r_3 =$ | 24.4378 | | $d_3 =$ | 2.610 | $n_{d2} = 1.77250$ | $\nu_{d2} = 49.60$ |
| $r_4 =$ | −88.4690 | | $d_4 =$ | 0.800 | $n_{d3} = 1.63636$ | $\nu_{d3} = 35.37$ |
| $r_5 =$ | 55.1463 | | $d_5 =$ | 1.163 | | |
| $r_6 =$ | ∞ (Stop) | | $d_6 =$ | 0.850 | | |
| $r_7 =$ | −64133.6418 | | $d_7 =$ | 10.197 | $n_{d4} = 1.71736$ | $\nu_{d4} = 29.51$ |
| $r_8 =$ | 15.3380 | | $d_8 =$ | 4.279 | $n_{d5} = 1.77250$ | $\nu_{d5} = 49.60$ |
| $r_9 =$ | −27.1236 | (Aspheric) | $d_9 =$ | 16.764 | | |
| $r_{10} =$ | −14.2958 | | $d_{10} =$ | 1.650 | $n_{d6} = 1.48749$ | $\nu_{d6} = 70.21$ |
| $r_{11} =$ | −40.8089 | | | | | |

Aspherical Coefficients

9th surface $P = 1.0000$
$A_4 = 0.19710 \times 10^{-4}$
$A_6 = 0.68681 \times 10^{-7}$
$A_8 = -0.73357 \times 10^{-9}$
$A_{10} = 0.78900 \times 10^{-11}$ Focusing or Floating Spaces

| OBJ | ∞ | −500 |
|---|---|---|
| $d_2$ | 15.687 | 15.893 |
| $d_9$ | 16.764 | 16.955 |

Example 7

$f = 21.15, F_{NO} = 2.85, \omega = 45.811°$

| | | | | | | |
|---|---|---|---|---|---|---|
| $r_1 =$ | 21.9601 | (Aspheric) | $d_1 =$ | 2.000 | $n_{d1} = 1.65160$ | $\nu_{d1} = 58.52$ |
| $r_2 =$ | 11.8035 | | $d_2 =$ | 18.104 | | |
| $r_3 =$ | 21.5082 | | $d_3 =$ | 2.824 | $n_{d2} = 1.78590$ | $\nu_{d2} = 44.19$ |
| $r_4 =$ | −34.1116 | | $d_4 =$ | 0.800 | $n_{d3} = 1.58267$ | $\nu_{d3} = 46.33$ |
| $r_5 =$ | −413.1548 | | $d_5 =$ | 1.063 | | |
| $r_6 =$ | ∞ (Stop) | | $d_6 =$ | 1.271 | | |
| $r_7 =$ | −31.4484 | | $d_7 =$ | 2.200 | $n_{d4} = 1.72151$ | $\nu_{d4} = 29.24$ |
| $r_8 =$ | 13.9583 | | $d_8 =$ | 3.058 | $n_{d5} = 1.75500$ | $\nu_{d5} = 52.33$ |
| $r_9 =$ | −20.9744 | (Aspheric) | $d_9 =$ | 15.141 | | |
| $r_{10} =$ | −10.1789 | | $d_{10} =$ | 1.650 | $n_{d6} = 1.48749$ | $\nu_{d6} = 70.21$ |
| $r_{11} =$ | −16.2012 | (Aspheric) | | | | |

Aspherical Coefficients

1st surface $P = 1.0000$
$A_4 = -0.56299 \times 10^{-5}$
$A_6 = -0.14684 \times 10^{-7}$
$A_8 = -0.64865 \times 10^{-10}$
$A_{10} = 0.18261 \times 10^{-12}$

9th surface $P = 1.0000$
$A_4 = 0.32302 \times 10^{-4}$
$A_6 = 0.84780 \times 10^{-6}$
$A_8 = -0.27757 \times 10^{-7}$
$A_{10} = 0.3334 \times 10^{-9}$

11th surface $P = 1.0000$
$A_4 = 0.64096 \times 10^{-4}$
$A_6 = -0.25094 \times 10^{-6}$
$A_8 = 0.11385 \times 10^{-8}$
$A_{10} = 0.92702 \times 10^{-12}$

Focusing or Floating Spaces

| OBJ | $\infty$ | $-500$ |
|---|---|---|
| $d_2$ | 18.104 | 18.027 |
| $d_9$ | 15.141 | 15.295 |

Example 8

$f = 28.25, F_{NO} = 2.08, \omega = 37.687°$

| | | | | | | | |
|---|---|---|---|---|---|---|---|
| $r_1 =$ | 23.6431 | (Aspheric) | $d_1 =$ | 4.829 | $n_{d1} = 1.77250$ | $\nu_{d1} = 49.60$ |
| $r_2 =$ | 16.3353 | | $d_2 =$ | 4.709 | | |
| $r_3 =$ | 28.5559 | | $d_3 =$ | 4.764 | $n_{d2} = 1.77250$ | $\nu_{d2} = 49.60$ |
| $r_4 =$ | -15.2447 | | $d_4 =$ | 0.800 | $n_{d3} = 1.59551$ | $\nu_{d3} = 39.21$ |
| $r_5 =$ | 32.7580 | | $d_5 =$ | 1.529 | | |
| $r_6 =$ | $\infty$ (Stop) | | $d_6 =$ | 0.716 | | |
| $r_7 =$ | 161.5334 | | $d_7 =$ | 2.200 | $n_{d4} = 1.58921$ | $\nu_{d4} = 41.08$ |
| $r_8 =$ | 13.5571 | | $d_8 =$ | 5.835 | $n_{d5} = 1.77250$ | $\nu_{d5} = 49.60$ |
| $r_9 =$ | -11.6513 | | $d_9 =$ | 2.200 | $n_{d6} = 1.80610$ | $\nu_{d6} = 33.27$ |
| $r_{10} =$ | -25.0755 | | $d_{10} =$ | 7.945 | | |
| $r_{11} =$ | -15.7322 | (Aspheric) | $d_{11} =$ | 1.650 | $n_{d7} = 1.48749$ | $\nu_{d7} = 70.21$ |
| $r_{12} =$ | -288.3362 | | | | | |

Aspherical Coefficients

1st surface $P = 1.0000$
$A_4 = -0.23740 \times 10^{-4}$
$A_6 = -0.13130 \times 10^{-6}$
$A_8 = -0.14094 \times 10^{-9}$
$A_{10} = -0.10233 \times 10^{-11}$

11th surface $P = 2.0750$
$A_4 = -0.54842 \times 10^{-4}$
$A_6 = 0.32652 \times 10^{-6}$
$A_8 = 0.29558 \times 10^{-8}$
$A_{10} = 0$

Focusing or Floating Spaces

| OBJ | $\infty$ | $-500$ |
|---|---|---|
| $d_2$ | 4.709 | 4.991 |
| $d_{10}$ | 7.945 | 7.644 |

Example 9

$f = 28.25, F_{NO} = 2.08, \omega = 37.685°$

| | | | | | | | |
|---|---|---|---|---|---|---|---|
| $r_1 =$ | 140.9251 | | $d_1 =$ | 10.040 | $n_{d1} = 1.48749$ | $\nu_{d1} = 70.21$ |
| $r_2 =$ | 19.3851 | | $d_2 =$ | 3.175 | | |
| $r_3 =$ | 29.6952 | (Aspheric) | $d_3 =$ | 2.000 | $n_{d2} = 1.74100$ | $\nu_{d2} = 52.65$ |
| $r_4 =$ | 63.4375 | | $d_4 =$ | 6.529 | | |

-continued

| | | | | | | | |
|---|---|---|---|---|---|---|---|
| $r_5 =$ | 63.0315 | | $d_5 =$ | 4.280 | $n_{d3} = 1.77250$ | $\nu_{d3} = 49.60$ |
| $r_6 =$ | -15.6267 | | $d_6 =$ | 0.800 | $n_{d4} = 1.58215$ | $\nu_{d4} = 42.09$ |
| $r_7 =$ | 57.7250 | | $d_7 =$ | 1.372 | | |
| $r_8 =$ | ∞ (Stop) | | $d_8 =$ | 1.475 | | |
| $r_9 =$ | 123.0481 | | $d_9 =$ | 2.524 | $n_{d5} = 1.62364$ | $\nu_{d5} = 36.54$ |
| $r_{10} =$ | 16.4456 | | $d_{10} =$ | 4.405 | $n_{d6} = 1.77250$ | $\nu_{d6} = 49.60$ |
| $r_{11} =$ | -19.3728 | | $d_{11} =$ | 2.200 | $n_{d7} = 1.84666$ | $\nu_{d7} = 23.88$ |
| $r_{12} =$ | -31.8861 | | $d_{12} =$ | 11.576 | | |
| $r_{13} =$ | -23.4321 | (Aspheric) | $d_{13} =$ | 3.073 | $n_{d8} = 1.48749$ | $\nu_{d8} = 70.21$ |
| $r_{14} =$ | -961.4600 | | | | | |

Aspherical Coefficients

3rd surface $P = 1.0000$
$A_4 = -0.26049 \times 10^{-4}$
$A_6 = -0.15919 \times 10^{-6}$
$A_8 = 0.20286 \times 10^{-9}$
$A_{10} = -0.34506 \times 10^{-11}$ 13th surface $P = 2.8226$
$A_4 = -0.74032 \times 10^{-4}$
$A_6 = 0.16831 \times 10^{-6}$
$A_8 = -0.19821 \times 10^{-8}$
$A_{10} = 0$ Focusing or Floating Spaces

| OBJ | ∞ | -500 |
|---|---|---|
| $d_2$ | 3.175 | 4.436 |
| $d_{12}$ | 11.576 | 10.843 |

Example 10

$f = 28.24, F_{NO} = 2.08, \omega = 37.548°$

| | | | | | | | |
|---|---|---|---|---|---|---|---|
| $r_1 =$ | 67.0467 | | $d_1 =$ | 1.850 | $n_{d1} = 1.60717$ | $\nu_{d1} = 40.26$ |
| $r_2 =$ | 22.8105 | (Aspheric) | $d_2 =$ | 6.695 | | |
| $r_3 =$ | 128.5307 | | $d_3 =$ | 1.300 | $n_{d2} = 1.49700$ | $\nu_{d2} = 81.61$ |
| $r_4 =$ | 26.7744 | | $d_4 =$ | 2.025 | | |
| $r_5 =$ | 29.0729 | | $d_5 =$ | 5.227 | $n_{d3} = 1.80100$ | $\nu_{d3} = 34.97$ |
| $r_6 =$ | 4926.3414 | | $d_6 =$ | 10.616 | | |
| $r_7 =$ | 28.5297 | (Aspheric) | $d_7 =$ | 4.687 | $n_{d4} = 1.80518$ | $\nu_{d4} = 25.43$ |
| $r_8 =$ | 11.2876 | | $d_8 =$ | 7.334 | $n_{d5} = 1.60300$ | $\nu_{d5} = 65.48$ |
| $r_9 =$ | 300.5721 | | $d_9 =$ | 1.000 | | |
| $r_{10} =$ | ∞ (Stop) | | $d_{10} =$ | 1.550 | | |
| $r_{11} =$ | -45.7434 | | $d_{11} =$ | 1.943 | $n_{d6} = 1.54041$ | $\nu_{d6} = 51.00$ |
| $r_{12} =$ | 15.6189 | | $d_{12} =$ | 4.014 | $n_{d7} = 1.77250$ | $\nu_{d7} = 49.60$ |
| $r_{13} =$ | -144.5286 | | $d_{13} =$ | 0.221 | | |
| $r_{14} =$ | 80.4465 | | $d_{14} =$ | 2.496 | $n_{d8} = 1.79500$ | $\nu_{d8} = 45.29$ |
| $r_{15} =$ | -44.4001 | | $d_{15} =$ | 12.595 | | |
| $r_{16} =$ | -14.5662 | (Aspheric) | $d_{16} =$ | 1.650 | $n_{d9} = 1.62045$ | $\nu_{d9} = 38.12$ |
| $r_{17} =$ | -39.6495 | | | | | |

Aspherical Coefficients

2nd surface $P = 1.3864$
$A_4 = 0.31056 \times 10^{-5}$
$A_6 = -0.18594 \times 10^{-7}$
$A_8 = 0.91239 \times 10^{-10}$
$A_{10} = -0.19778 \times 10^{-12}$ 7th surface $P = 1.0000$
$A_4 = 0.12792 \times 10^{-5}$
$A_6 = -0.52811 \times 10^{-7}$
$A_8 = 0.56840 \times 10^{-9}$
$A_{10} = -0.24022 \times 10^{-11}$ 16th surface $P = 1.5704$
$A_4 = -0.27588 \times 10^{-4}$
$A_6 = 0.22412 \times 10^{-6}$ -continued $A_8 = -0.35098 \times 10^{-8}$
$A_{10} = 0.14958 \times 10^{-10}$ Focusing or Floating Spaces

| OBJ | ∞ | −500 |
|---|---|---|
| $d_4$ | 2.025 | 1.888 |
| $d_6$ | 10.616 | 10.898 |

Set out below are the values concerning the above-mentioned conditions in the examples according to the present invention as well as the values of the half and effective angles of field in degrees.

| Example | $-f_1/f$ | $-f_1/f_3$ | $f_{21}/f_{22}$ | $e'/f$ | $e_{12}/f$ | $f_{12}/f$ |
|---|---|---|---|---|---|---|
| 1 | 2.525 | 1.501 | 1.289 | −0.313 | 0.479 | |
| 2 | 1.859 | 1.518 | 1.310 | −0.297 | 0.246 | |
| 3 | 2.276 | 1.2908 | 1.108 | | 0.482 | |
| 4 | 1.520 | 0.995 | 1.092 | | 0.207 | |
| 5 | 1.378 | 0.766 | 1.712 | 18.17 | 0.116 | |
| 6 | 2.270 | 1.389 | 1.429 | −0.664 | | 3.550 |
| 7 | 2.008 | 0.688 | 0.411 | −1.661 | | 1.272 |
| 8 | | | | 0.211 | | 3.623 |
| 9 | 4.927 | 2.823 | 2.461 | −0.397 | | 4.187 |
| 10 | 27.558 | 20.444 | 3.661 | −0.486 | | 3.373 |

| Example | $f_{23}/f$ | ω | Effective angle of field |
|---|---|---|---|
| 1 | | 37.55 | 35.99 |
| 2 | | 37.66 | 35.96 |
| 3 | | 37.546 | 35.856 |
| 4 | | 35.277 | 33.034 |
| 5 | | 37.503 | 34.222 |
| 6 | 1.652 | 37.462 | 35.836 |
| 7 | 10.766 | 45.811 | 44.729 |
| 8 | 1.301 | 37.687 | 35.306 |
| 9 | 1.438 | 37.685 | 35.645 |
| 10 | 1.626 | 37.548 | 35.654 |

EFFECT OF THE INVENTION

As can be clearly understood from the foregoing, the present invention provides a symmetrical wide-angle lens system containing an aperture stop and comprising negative lens groups located in front of and behind a converging lens group, wherein an aspherical surface is used for a meniscus lens forming the first lens group, so that sagittal coma or flares peculiar to this type of wide-angle lens system (which are produced especially at a large angle of field) can be well corrected. Another aspherical surface is used for the surface of the second lens group that faces an object side for spherical aberration correction while a further aspherical surface is used for the surface of the second lens group that faces an image side for correction of off-axis astigmatism. Furthermore, the flatness of field can be greatly improved by using an aspherical surface in the third lens group, thereby enabling a wide-angle lens system having a large aperture ratio to be achieved. As a matter of course, the present invention makes it possible to provide a lens system of high performance using a reduced number of lenses.

Thus, the present invention can provide an unheard-of wide-angle lens system having a large aperture ratio in the form of a relatively compact lens system.

The present invention also provides a symmetrical wide-angle lens system comprising three negative, positive and negative lens groups wherein, by basically using the second lens group as a focusing lens group, variable spacings between the lens groups are allowed to cooperate with each other in reducing or substantially eliminating aberration variations. On the other hand, a problem associated with a conventional focusing method involving the movement of the entire system is that spherical aberration and astigmatism change in opposite directions without making any modification thereto. According to the present invention, however, this problem can be solved by varying the spacings between the lens groups and controlling the amount of movement of the lens groups as well to reduce or substantially eliminate aberration variations. Thus, the potential performance of the wide-angle lens system according to the present invention can be maintained even when upon focused on a finite object. In particular, the present invention ensures a major advance in wide-angle lens systems now required to have a large aperture ratio.

The entirety of JP-7-121633 and JP-7-121634, both filed on May 19, 1995, from which priority under 35 USC 119 is claimed, is incorporated herein by reference.

What we claim is:

1. A wide-angle lens system comprising, basically in order from an object side;

a first lens group having a negative refracting power;

a second lens group having a positive refracting power and including an aperture stop; and a third lens group having a negative refracting power, wherein said second lens group is divided into front and rear sub-groups $G_{21}$, and $G_{22}$, each having a positive refracting power, between which said aperture stop is located, said first lens group comprises at least one negative meniscus lens convex on the object side, said front sub-group of said second lens group comprising at least one set of cemented lenses containing a positive lens and a negative lens, and said rear sub-group of said second lens group comprising at least one set of cemented lenses containing a positive lens and a negative lens, said third lens group comprises at least one negative meniscus lens convex on an image side, an aspherical surface is used in any one of said lens groups, and said wide-angle lens system is a fixed focus lens system.

2. A wide-angle lens system comprising, basically in order from an object side;

a first lens group having a negative refracting power;

a second lens group having a positive refracting power and including an aperture stop; and a third lens group having a negative refracting power, wherein said second lens group is divided into front and rear sub-groups $G_{21}$ and $G_{22}$, each having a positive refracting power, between which said aperture stop is located, said first lens group comprises at least one negative meniscus lens convex on the object side, said front sub-group of said second lens group comprising at least one set of cemented lenses containing a positive lens and a negative lens, and said rear sub-group of said second lens group comprising at least one set of cemented lenses containing a positive lens and a negative lens, said third lens group comprises at least one negative meniscus lens convex on an image side, and said wide-angle lens system is a fixed focus lens system in which focusing from an object at infinity on a finite object is effected by an inner focusing method in which said second lens group is moved from a reference position toward the object side without varying the entire length of said wide-angle lens system while the spacing between said first and second lens groups is decreased with an increase in the spacing between said second and third lens groups.

3. A wide-angle lens system comprising, basically in order from an object side:

a first lens group having a negative refracting power:

second lens group having a positive refracting power and including an aperture stop, and a third lens group having a negative refracting power, wherein said second lens group is divided into front and rear sub-groups $G_{21}$ and $G_{22}$, each having a positive refracting power, between which said aperture stop is located, said first lens group comprises at least one negative meniscus lens convex on the object side, said front sub-group of said second lens group comprising at least one set of cemented lenses containing a positive lens and a negative lens, and said rear sub-group of said second lens group comprising at least one set of cemented lenses containing a positive lens and a negative lens, said third lens group comprises at least one negative meniscus lens convex on an image side, and said wide-angle lens system is a fixed focus lens system in which focusing from an object at infinity on a finite object is effected by moving the entire system toward the object side and, at the same time, varying the spacings between the respective lens groups or an inner space of a given lens group, so that aberration variations can be corrected.

4. A wide-angle lens system according to claim 1 or 2, in which the following condition (1) is satisfied:

$$0.2 < -f_1/f < 30 \tag{1}$$

where $f_1$ is the focal length of the first lens group; and f is the focal length of the entire system.

5. A wide-angle lens system according to claim 4, in which the following condition (1)' is satisfied:

$$0.2 < -f_1/f < 3 \tag{1}'$$

6. A wide-angle lens system according to claim 1 or 2, in which the following condition (2) is satisfied:

$$0.15 < f_1/f_3 < 25 \tag{2}$$

where $f_1$ is the focal length of the first lens group; and $f_3$ is the focal length of the third lens group.

7. A wide-angle lens system according to claim 6, in which the following condition (2)' is satisfied:

$$0.15 < f_1/f_3 < 2.5 \tag{2}'$$

8. A wide-angle lens system according to claim 1 or 2, in which the following condition (3) is satisfied:

$$0.2 < f_{21}/f_{22} < 5 \tag{3}$$

where $f_{21}$ is the focal length of the front sub-group of the second lens group; and $f_{22}$ is the focal length of the rear sub-group of the the second lens group.

9. A wide-angle lens system according to claim 8, in which the following condition (3)' is satisfied:

$$0.2 < f_{21}/f_{22} < 2 \tag{3}'$$

10. A wide-angle lens system according to claim 1, in which the following condition (4) is satisfied:

$$-3 < e'/f < 20 \tag{4}$$

where f is the focal length of the entire system; and e' is a principal point spacing when the first lens group and the front sub-group of the second lens group are taken as being one lens group and the rear sub-group of the second lens group and the third lens group are taken as being one lens group.

11. A wide-angle lens system according to claim 3, in which the following condition (4)' is satisfied:

$$-3 < e'/f < 1 \tag{4}'$$

where f is the focal length of the entire system; and e' is the principal point spacing between a sub-system comprising the first lens group and the front sub-group of the second lens group and a sub-system comprising the rear sub-group of the second lens group and the third lens group.

12. A wide-angle lens system according to claim 2, in which the following condition (5) is satisfied:

$$0.03 < e_{12}/f < 1 \tag{5}$$

where f is the focal length of the entire system; and $e_{12}$ is the principal point spacing between the first lens group and the front sub-group of the second lens group.

13. A wide-angle lens system according to claim 3, in which the following condition (6) is satisfied:

$$0.2 < f_{12}/f < 16 \tag{6}$$

where $f_{12}$ is the composite focal length of the first and second lens groups; and f is the focal length of the entire system.

14. A wide-angle lens system according to claim 3, in which the following condition (7) is satisfied:

$$-5 < f_{23}/f < 12 \tag{7}$$

where $f_{23}$ is the composite focal length of the rear sub-group of the second lens group and the third lens group; and f is the focal length of the entire system.

15. A wide-angle lens system comprising, in order from an object side:

a first lens group having a negative refracting power;

a second lens group having a positive refracting power and including an aperture stop; and a third lens group having a negative refracting power, wherein said second lens group is divided into front and rear sub-groups $G_{21}$ and $G_{22}$, each having a positive refracting power, between which said aperture stop is located, said first lens group comprises at least one negative meniscus lens convex on the object side, said front sub-group of said second lens group comprising at least one set of cemented lenses containing a positive lens and a negative lens, and said rear sub-group of said second lens group comprising at least one set of cemented lenses containing a positive lens and a negative lens, said third lens group comprises at least one negative meniscus lens convex on an image side, an aspherical surface is used in any one of said lens groups, and at least one aspherical surface is used in said first lens group.

16. A wide-angle lens system comprising, in order from an object side:

a first lens group having a negative refracting power;

a second lens group having a positive refracting power and including an aperture stop; and a third lens group having a negative refracting power, wherein said second lens group is divided into front and rear sub-groups $G_{21}$ and $G_{22}$ each having a positive refracting power, between which said aperture stop is located, said first lens group comprises at least one negative meniscus lens convex on the object side, said front sub-group of said second lens group comprising at least one set of cemented lenses containing a positive lens and a negative lens, and said rear sub-group of said second lens group comprising at least one set of cemented lenses containing a positive lens and a negative lens, said third lens group comprises at least one negative meniscus lens convex on an image side, an aspherical surface is used in any one of said lens groups, and at least one aspherical surface is used in said second lens group.

17. A wide-angle lens system according to claim 1, in which at least one aspherical surface is used in said third lens group.

18. A wide-angle lens system comprising, in order from an object side:

a first lens group having a negative refracting power;

a second lens group having a positive refracting power and including an aperture stop; and a third lens group having a negative refracting power, wherein said second lens group is divided into front and rear sub-groups $G_{21}$ and $G_{22}$, each having a positive refracting power, between which said aperture stop is located, said first lens group comprises at least one negative meniscus lens convex on the object side, said front sub-group of said second lens group comprising at least one set of cemented lenses containing a positive lens and a negative lens, and said rear sub-group of said second lens group comprising at least one set of cemented lenses containing a positive lens and a negative lens, said third lens group comprises at least one negative meniscus lens convex on an image side, an aspherical surface is used in any one of said lens groups and at least one aspherical surface is used in each of said first lens group and said second lens group.

19. A wide-angle lens system comprising, in order from an object side:

a first lens group having a negative refracting power;

a second lens group having a positive refracting power and including an aperture stop; and a third lens group having a negative refracting power, wherein said second lens group is divided into front and rear sub-groups $G_{21}$ and $G_{22}$, each having a positive refracting power, between which said aperture stop is located, said first lens group comprises at least one negative meniscus lens convex on the object side, said front sub-group of said second lens group comprising at least one set of cemented lenses containing a positive lens and a negative lens, and said rear sub-group of said second lens group comprising at least one set of cemented lenses containing a positive lens and a negative lens, said third lens group comprises at least one negative meniscus lens convex on an image side, an aspherical surface is used in any one of said lens groups, and at least one aspherical surface is used in each of said second lens group and said third lens group.

20. A wide-angle lens system comprising, in order from an object side:

a first lens group having a negative refracting power;

a second lens group having a positive refracting power and including an aperture stop; and a third lens group having a negative refracting power, wherein said second lens group is divided into front and rear sub-groups $G_{21}$ and $G_{22}$, each having a positive refracting power, between which said aperture stop is located, said first lens group comprises at least one negative meniscus lens convex on the object side, said front sub-group of said second lens group comprising at least one set of cemented lenses containing a positive lens and a negative lens, and said rear sub-group of said second lens group comprising at least one set of cemented lenses containing a positive lens and a negative lens, said third lens group comprises at least one negative meniscus lens convex on an image side, an aspherical surface is used in any one of said lens groups, and at least one aspherical surface is used in each of said first lens group and said third lens group.

21. A wide-angle lens system comprising, in order from an object side:
   a first lens group having a negative refracting power;
   a second lens group having a positive refracting power and including an aperture stop; and
   a third lens group having a negative refracting power, wherein
   said second lens group is divided into front and rear sub-groups $G_{21}$ and $G_{22}$, each having a positive refracting power, between which said aperture stop is located,
   said first lens group comprises at least one negative meniscus lens convex on the object side,
   said front sub-group of said second lens group comprising at least one set of cemented lenses containing a positive lens and a negative lens, and
   said rear sub-group of said second lens group comprising at least one set of cemented lenses containing a positive lens and a negative lens,
   said third lens group comprises at least one negative meniscus lens convex on an image side,
   an aspherical surface is used in any one of said lens groups, and
   at least one aspherical surface is used in each of said first lens group, said second lens group and said third lens group.

22. A wide-angle lens system according to claim 2, wherein when focusing is to be effected from an object at infinity on a finite object, said second lens group is moved from a reference position toward the object while a part of the lens spacing between said front and rear sub-groups $G_{21}$ and $G_{22}$ forming said second lens group is varied, thereby compensating for aberration variations during focusing.

23. A wide-angle lens system according to claim 3, wherein aberration variations are compensated for by allowing said first lens group to consist of a negative meniscus lens convex on the object side and a positive lens, and varying the spacing between the lenses forming said first lens group when focusing is to be effected from an object at infinity on a finite object.

24. A wide-angle lens system according to claim 3, wherein when focusing is to be effected from an object at infinity on a finite object, said first and second lens groups are moved such that the spacing therebetween is decreased, and the spacing between said second and third lens groups is varied.

25. A wide-angle lens system according to claim 3, wherein when focusing is to be effected from an object at infinity on a finite object, the internal spacing of said second lens group is varied.

* * * * *